(12) United States Patent
Na

(10) Patent No.: US 11,861,223 B2
(45) Date of Patent: *Jan. 2, 2024

(54) MEMORY CONTROLLER AND STORAGE DEVICE FOR SCHEDULING ADDRESSES

(71) Applicant: SK hynix Inc., Gyeonggi-do (KR)

(72) Inventor: Chung Un Na, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 266 days.

This patent is subject to a terminal disclaimer.

(21) Appl. No.: 17/365,160

(22) Filed: Jul. 1, 2021

(65) Prior Publication Data

US 2022/0197560 A1 Jun. 23, 2022

(30) Foreign Application Priority Data

Dec. 18, 2020 (KR) .................. 10-2020-0178159

(51) Int. Cl.
G06F 3/06 (2006.01)

(52) U.S. Cl.
CPC ............ *G06F 3/0659* (2013.01); *G06F 3/064* (2013.01); *G06F 3/0605* (2013.01); *G06F 3/0652* (2013.01); *G06F 3/0679* (2013.01)

(58) Field of Classification Search
CPC ........ G06F 3/0605; G06F 3/061; G06F 3/064; G06F 3/0652; G06F 3/0659; G06F 3/0679; G06F 12/0246; G06F 12/0292; G06F 12/10; G06F 12/1009; G06F 2212/7201; G06F 2212/7207; G11C 7/12; G11C 8/08

See application file for complete search history.

(56) References Cited

U.S. PATENT DOCUMENTS

| | | |
|---|---|---|
| 9,792,995 B1 | 10/2017 | Shah et al. |
| 2011/0072243 A1 | 3/2011 | Qiu et al. |
| 2014/0258596 A1 | 9/2014 | Kojima |

(Continued)

FOREIGN PATENT DOCUMENTS

| | | |
|---|---|---|
| KR | 10-2010-0120518 A | 11/2010 |
| KR | 10-2017-0141298 A | 12/2017 |

(Continued)

OTHER PUBLICATIONS

Notice of Allowance for U.S. Appl. No. 17/365,185 issued by the USPTO dated Jun. 15, 2022.

(Continued)

*Primary Examiner* — Larry T Mackall
(74) *Attorney, Agent, or Firm* — IP & T GROUP LLP

(57) ABSTRACT

There are provided a memory controller and a storage device including the same. The memory controller includes: a command storage including a first read command queue and a second read command queue; a command generation controller for storing a first read command generated in response to a read request and a first physical address in the first read command queue; and a command schedule controller for searching for a first physical address group including at least one second physical address including a page number equal to that of the physical address among the physical addresses stored in the first read command queue and the first physical address, in response to a scheduling event signal provided from the command generation controller.

20 Claims, 21 Drawing Sheets

(56) References Cited

U.S. PATENT DOCUMENTS

| | | | |
|---|---|---|---|
| 2015/0380097 A1* | 12/2015 | Sato | G11C 16/26 |
| | | | 365/185.12 |
| 2017/0206007 A1* | 7/2017 | Shin | G06F 3/061 |
| 2018/0011635 A1* | 1/2018 | Shin | G06F 3/068 |
| 2018/0211707 A1* | 7/2018 | Nosaka | G11C 16/26 |
| 2018/0232157 A1* | 8/2018 | Seo | G06F 3/0688 |
| 2019/0369917 A1 | 12/2019 | Jin | |
| 2020/0192735 A1 | 6/2020 | Ioannou et al. | |
| 2020/0272357 A1 | 8/2020 | Strait et al. | |
| 2020/0310643 A1 | 10/2020 | Li et al. | |
| 2021/0271409 A1* | 9/2021 | Ben-Rubi | G06F 3/0659 |
| 2022/0197560 A1 | 6/2022 | Na | |

FOREIGN PATENT DOCUMENTS

| | | |
|---|---|---|
| KR | 10-2019-0019543 A | 2/2019 |
| KR | 10-2019-0089365 A | 7/2019 |
| KR | 10-2022-0087785 A | 6/2022 |

OTHER PUBLICATIONS

Notice of Allowance for the U.S. Appl. No. 17/365, 185 issued by the USPTO dated Sep. 26, 2022.

* cited by examiner

| Index | Physical Address | | | | RCMD |
|---|---|---|---|---|---|
| 0 | P0 | BLK100 | PG30 | S0<br>S1<br>S2<br>S3 | RCMD1<br>(SP read) |
| 1 | P0 | BLK200 | PG10 | S3 | RCMD2 |
| 2 | P1 | BLK301 | PG50 | S0<br>S1 | RCMD3<br>(SP read) |
| 3 | P3 | BLK903 | PG75 | S1 | RCMD4 |
| 4 | | | | | |
| 5 | | | | | |
| 6 | | | | | |
| 7 | | | | | |

220

222

| Index | Physical Address | RCMD |
|---|---|---|
| 0 | | |
| 1 | | |
| 2 | | |
| 3 | | |
| 4 | | |
| 5 | | |
| 6 | | |
| 7 | | |

FIG. 9

| Index | Physical Address | | | | RCMD |
|---|---|---|---|---|---|
| 0 | P0 | BLK100 | PG30 | S0<br>S1<br>S2<br>S3 | RCMD1<br>(SP read) |
| 1 | P0 | BLK200 | PG10 | S3 | RCMD2 |
| 2 | P1 | BLK301 | PG50 | S0<br>S1 | RCMD3<br>(SP read) |
| 3 | P3 | BLK903 | PG75 | S1 | RCMD4 |
| 4 | | | | | |
| 5 | | | | | |
| 6 | | | | | |
| 7 | | | | | |

221

| P1 | BLK201 | PG30 | S2 | → (index 4)

| Index | Physical Address | | | RCMD |
|---|---|---|---|---|
| 0 | P1 | BLK101 | PG5 | S0 | RCMD1 |
| 1 | | | | |
| 2 | | | | |
| 3 | | | | |
| 4 | | | | |

223'

| Index | Physical Address | RCMD |
|---|---|---|
| 0 | | |
| 1 | | |
| 2 | | |
| 3 | | |
| 4 | | |

221'

| Index | Physical Address | | | RCMD |
|---|---|---|---|---|
| 0 | P0 | BLK100 | PG5 | S0 S1 | BRCMD1 |
| 1 | | | | |
| 2 | | | | |
| 3 | | | | |
| 4 | | | | |

MEMORY CONTROLLER AND STORAGE DEVICE FOR SCHEDULING ADDRESSES

CROSS-REFERENCE TO RELATED APPLICATION

The present application claims priority under 35 U.S.C. § 119(a) to Korean patent application number 10-2020-0178159, filed on Dec. 18, 2020 with the Korean Intellectual Property Office, and which is incorporated herein by reference in its entirety.

BACKGROUND

Field of Invention

One or more embodiments described herein relate to a memory controller and a storage device including a memory controller.

Description of Related Art

A memory controller may control the storage of data in memory device based on instructions from a host. A volatile memory device stores data when supplied with power. The data is lost when the power is interrupted. Examples of a volatile memory device include a Static Random Access Memory (SRAM) and a Dynamic Random Access Memory (DRAM). A nonvolatile memory device stores data even when power is interrupted. Examples of a nonvolatile memory device include a Read Only Memory (ROM), a Programmable ROM (PROM), an Electrically Programmable ROM (EPROM), an Electrically Erasable ROM (EEROM), and a flash memory.

SUMMARY

One or more embodiments described herein provide a memory controller capable of improving performance of a read operation. One or more additional embodiments include a storage device that may be equipped with such a memory controller.

In accordance with an aspect of the present disclosure, there is provided a memory controller including: a command storage including a first read command queue and a second read command queue, the first read command queue configured to store read commands and physical addresses corresponding to the read commands based on index number, wherein the read commands instruct a memory device to read data stored in a memory device including a plurality of memory blocks, and wherein each of the physical addresses correspond to a plane number, a block number, and a page number; a command generation controller configured to generate a first read command in response to a read request, translate a logical address to a first physical address, and store the first read command and the first physical address in the first read command queue; and a command schedule controller configured to search for a first physical address group in response to a scheduling event signal from the command generation controller, the first physical address group including at least one second physical address including a page number that corresponds to a physical address stored in the first read command queue and the first physical address, wherein the command schedule controller is configured to sequentially schedule a second physical address group and the first physical address group in consecutive index numbers of the second read command queue, the second physical address group including at least one physical address with a plane number different from the plane number of the first physical address group stored in the first read command queue.

In accordance with another aspect of the present disclosure, there is provided a memory controller including: a command storage including a first read command queue, a second read command queue, and a third read command queue, wherein the first read command queue is configured to store a first physical address and a first read command instructing a memory device to perform a read operation while a background operation is performed, and wherein the first physical address corresponds to a first plane number, a first block number, and a first page number; a command generation controller configured to translate, to a second physical address, a logical address and a second read command instructing the memory device to read data stored in the memory device, in response to a read request provided while the background operation is performed, and store the second read command and the second physical address in the second read command queue, wherein the second physical address corresponds to a second plane number, a second block number, and a second page number; and a command schedule controller configured to schedule the first physical address, the second physical address, and the second read command in the third read command queue according to whether the first page number equals the second page number.

In accordance with still another aspect of the present disclosure, there is provided a storage device including: a memory device including a plurality of planes; and a memory controller configured to store, in a first read command queue, a first read command and a first physical address in response to a read request, the first read command instructing the memory device to perform a read operation including reading data stored in the memory device and the first physical address mapped to a logical address, wherein the memory controller is further configured to sequentially provide read commands and physical addresses, which are stored in the first read command queue, to the memory device according to a scheduled sequence, and wherein each of the physical addresses includes a plane number, a block number, and a page number, and when a page number of a second physical address scheduled in a first priority index number of the physical addresses stored in the first read command queue and a page number of the first physical address are equal, the memory controller is configured to schedule the first physical address in the first priority index number.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 8 illustrates an embodiment of a command storage.

FIG. 9 illustrates an embodiment of storing a read command and a physical address in a read command queue.

FIG. 15 illustrates an embodiment of a command storage.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
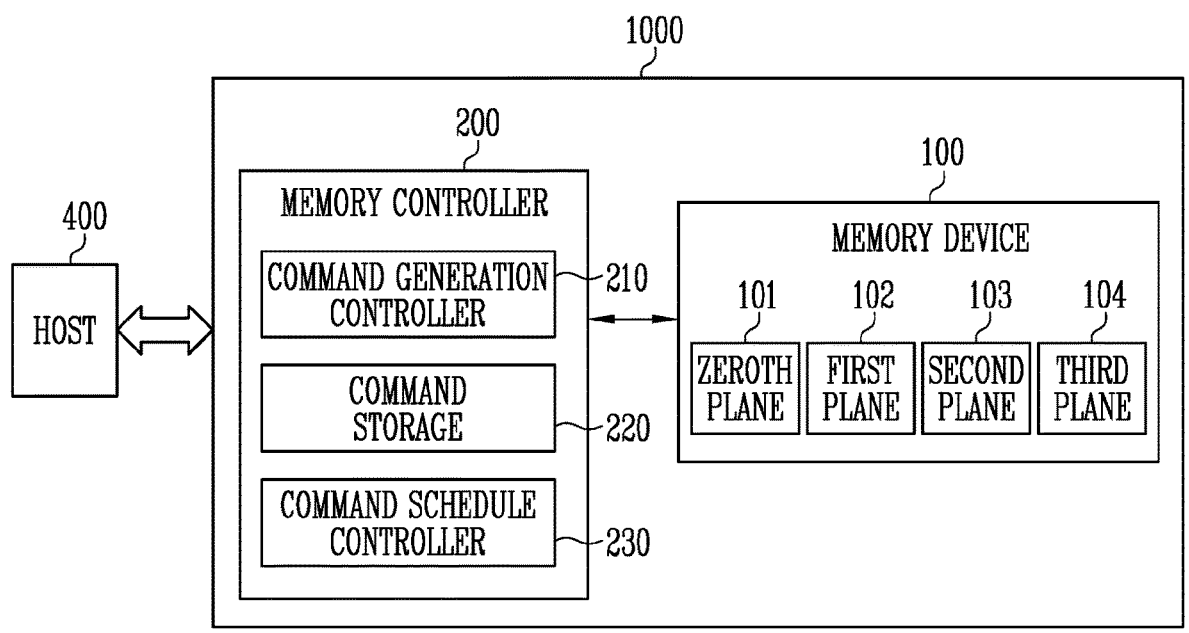
FIG. 1 illustrates an embodiment of a storage system.

FIG. 1 is a diagram illustrating a storage system in accordance with an embodiment. The storage system may be implemented as a data processing system including, for example, a personal computer (PC), a data center, and an enterprise type data storage system, and a direct attached storage (DAS), a data processing system including a storage area network (SAN), a data processing system including a network attached storage, or another type of system or device.

Referring to FIG. 1, the storage system may include a storage device 1000 and a host 400. The storage device 1000 may store data according to a request of the host 400, such as a mobile phone, a smart phone, an MP3 player, a laptop computer, a desktop computer, a game console, a TV, a tablet PC or an in-vehicle infotainment system.

The storage device 1000 may be manufactured as any one of various types of storage devices according to a host interface that is a communication scheme with the host 400. Examples include a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 1000 may be manufactured as any one of various kinds of package types. Examples a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

In an embodiment, one storage device 1000 may be provided as shown in FIG. 1. However, the present disclosure is not limited thereto, and two or more storage devices 1000 may be provided. A plurality of storage devices 1000 may operate by using a redundant array of independent disks (RAID) scheme or a redundant array of inexpensive disks (RAID) scheme, in which the plurality of storage devices 1000 operate as one storage device.

The storage device 1000 may include a memory device 100 and a memory controller 200. The memory device 100 may operate under the control of the memory controller 200. For example, the memory device 100 may receive a command and an address from the memory controller 200, and access a memory cell selected by the address among memory cells. The memory device 100 may perform an operation instructed by the command on the memory cell selected by the address.

The command may be, for example, a program command, a read command, or an erase command. A program command may instruct the memory device to perform a program operation (or write operation). A read command may instruct the memory device 100 to perform a read operation. An erase command may instruct the memory device 100 to perform an erase operation. Thus, operations instructed by corresponding ones of the commands may be, for example, a program operation (or write operation), a read operation, or an erase operation.

Additionally, a program operation may be an operation in which the memory device 100 stores data provided from the host 400 under the control of the memory controller 200. In one embodiment, the program operation may be an operation of storing data in any one memory block among a plurality of memory blocks in the memory device 100.

For example, the memory device 100 may receive a program command, an address, and data, and program the data in a memory cell selected by the address. The data to be programmed in the selected memory cell may be referred to as write data. The write data may include data (or user data) provided from the host 400 and meta data of the data.

A read operation may be an operation in which the memory device 100 reads read data stored in the memory device 100 under the control of the memory controller 200. For example, the memory device 100 may receive a read command and an address, and read data from an area selected by the address in a memory cell array. The data to be read from the selected area among data stored in the memory device 100 may be defined as read data.

An erase operation may be an operation in which the memory device 100 erases data stored in the memory device 100 under the control of the memory controller 200. In one embodiment, an erase operation may erase data stored in any one memory block among the plurality of memory blocks in the memory device 100. For example, the memory device 100 may receive an erase command and an address, and erase data stored in an area selected by the address.

The memory device 100 may be implemented as a volatile memory device or a nonvolatile memory device. Examples of a volatile memory device include a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), and the like. Examples of a nonvolatile memory device may include a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), and a flash memory. The flash memory may include, for example, a NAND flash memory, a vertical NAND flash memory, a NOR flash memory, and the like. For illustrative purposes, it is assumed that the memory device 100 is a NAND flash memory.

The memory device 100 may store write data under the control of the memory controller 200, or may read stored read data and provide the read data to the memory controller 200.

The memory device 100 may include a plurality of planes 101, 102, 103, and 104. The number of planes may be 4 as shown in FIG. 1, but the present disclosure is not limited thereto. Each plane may include a memory cell array including memory cells for storing write data. The memory cell array may include a plurality of memory blocks. A memory block may be a unit for performing an erase operation of erasing data. A memory block may include a plurality pages, with each page corresponding to a unit for performing a program operation of storing write data or a read operation of reading stored read data.

The memory cell may be configured as any one of a Single Level Cell (SLC) storing 1-bit data, a Multi-Level Cell (MLC) storing 2-bit data, a Triple Level Cell (TLC) storing 3-bit data, and a Quadruple Level Cell (QLC) storing 4-bit data. However, the present disclosure is not limited thereto, and the memory cell may store 5 or more-bit data.

In an embodiment, the memory device 100 may perform an operation instructed by a command using, for example, a plane interleaving scheme. A plane interleaving scheme may be a scheme in which operations on respective ones of two or more planes at least partially overlap with each other. For example, the memory device 100 may perform a read operation on a zeroth plane 101 and a read operation on a first plane 102 to overlap with each other. However, the present disclosure is not limited thereto.

The memory controller 200 may control overall operation of the storage device 1000. For example, when power is applied to the storage device 1000, the memory controller 200 may execute instructions (e.g., firmware). When the memory device 100 is a flash memory device, the firmware may include a host interface layer, a flash translation layer, and a flash interface layer. The power may be supplied, for example, from an external supply.

The host interface layer may control an operation between the host 400 and the memory controller 200.

The flash translation layer may translate a logical address provided from the host 400 into a physical address, and may control communications between the memory controller 200 and the memory device 100.

The memory controller 200 may control the memory device 100 to perform a program operation, a read operation, and an erase operation respectively in response to a write request, a read request, and an erase request of the host 400.

In a program operation, the memory controller 200 may provide the memory device 100 with a program command, a physical address, and write data. In an embodiment, in a program operation, the memory controller 200 may provide the memory device 100 with a program command and a physical address. Also, the memory controller 200 may provide a flush command to a buffer memory to provide (or flush) data temporarily stored in the buffer memory to the memory device 100. When the data temporarily stored in the buffer memory is provided to the memory device 100, data temporarily stored in the buffer memory may be erased.

In a read operation, the memory controller 200 may provide the memory device 100 with a read command and a physical address.

In an erase operation, the memory controller 200 may provide the memory device 100 with an erase command and a physical address.

In an embodiment, the physical address may include a plane number, a block number, a page number, and a sub-page number.

The memory controller 200 may autonomously generate a command, an address, and data regardless of any request provided from the host 400. The memory controller 200 may transmit the command, the address, and the data, which are autonomously generated, to the memory device 100. For example, the memory controller 200 may generate a command for performing a background operation, an address, and data. Also, the memory controller 200 may provide memory device 100 with the command, the address, and the data. The command for performing the background operation may be, for example, a program command or a read command.

The background operation may be at least one of wear leveling, read reclaim, and garbage collection. Wear leveling may include, for example, static wear leveling, dynamic wear leveling, etc. Static wear leveling may include an operation of storing a number of times memory blocks are erased, and moving cold data on which any erase operation or any write operation is hardly performed to a memory block which is erased a largest number of times. Dynamic wear leveling may include an operation of storing a number of times memory blocks are erased, and programing data in a memory block which is erased a smallest number of times.

Read reclaim may include an operation of moving data stored in a memory block to another memory block before an uncorrectable error occurs in the data stored in the memory block.

Garbage collection may include an operation of copying valid data included in a bad block among memory blocks to a free block, and erasing invalid data in the bad block. Copying valid data in a bad block to a free block may include moving the valid data in the bad block to the free block.

In an embodiment, the memory controller 200 may control the memory device 100 to perform a background operation in predetermined period, e.g., an idle period or another period. An idle period may include, for example, a period in which any request of the host 400 is not provided.

In one embodiment, the idle period may include a period corresponding to that from a time at which a response to a request of the host 400 is provided to the host 400 to a time at which a subsequent request of the host 400 is provided to the storage device 1000.

In an embodiment, the memory controller 200 may control two or more memory devices 100. The memory controller 200 may control the memory devices 100 according, for example, to an interleaving scheme to improve operational performance. An interleaving scheme may include controlling operations on the two or more memory devices 100 to overlap with each other.

The memory controller 200 may sequentially store a command and a physical address in at least one command queue, and may provide the memory device with the command and the physical address, which are stored in the command queue, according to a scheduled sequence. The command and the physical address, which are stored in the command queue, may be output according to a first-in first-out (FIFO) scheme. However, the present disclosure is not limited thereto.

For example, the memory controller 200 may sequentially store a read command and a physical address in a read command queue, and sequentially provide the read command and the physical address, which are stored in the read command queue, to the memory device 100.

In one example, the memory controller 200 may store a program command and a physical address in a program command queue, and store a read command and a physical address in a read command queue. Also, the memory controller 200 may first provide the program command and the physical address to the memory device 100 and then provide the read command and the physical address to the memory device 100.

The memory controller 200 may provide an erase command to the memory device 100. While the memory device 100 performs an erase operation in response to the erase command, the memory controller 200 may receive a request (e.g., a read request) from the host 400. The memory controller 200 may provide a suspend command in response to the request of the host 400. The suspend command may instruct the memory device 100 to suspend the erase operation. After the suspend command is provided to the memory device 100, the memory controller 200 may provide the memory device 100 with a command (e.g., a read command) instructing the memory device 100 to perform an operation corresponding to the request of the host 400. The memory device 100 may suspend the erase operation in response to the suspend command, and perform an operation (e.g., a read operation) in response to the command (e.g., the read command). After the operation corresponding to the request is completed, the memory controller 200 may provide a resume command to the memory device 100. A resume command may instruct the memory device 100 to resume the erase operation. The memory device 100 may resume the erase operation in response to the resume command.

When the erase command is resumed in response to the resume command, there may be a certain preparation time until the erase operation is normally performed. This preparation time may be a time delayed until the erase operation is normally performed. When the host 400 provides a request (e.g., a read request) to the memory controller 200 during the preparation time, a command (e.g., a read command) instructing the memory device 100 to perform an operation corresponding to the request may be continuously stored in a command queue. When commands are continuously queued in the command queue, a response to the request of the host 400 may be delayed.

When commands instructing an operation on any one plane among the plurality of planes 101, 102, 103, and 104 are sequentially stored in a command queue, a command to be output next may be provided to the memory device 100 only when an operation instructed by a command output first is completed. For example, while the operation instructed by the command output first is performed, the command to be output next may be queued in the command queue. In one embodiment, when a program command instructing a program operation on the zeroth plane 101 and a read command instructing a read operation on the zeroth plane 101 are sequentially stored in each command queue, based on the program command the read command, the read command may be queued in the command queue while the program operation is performed.

While the operation instructed by the command output first is not completed but continuously performed, a read request of the host 400 may be provided to the memory controller 200. A read command for the read request of the host 400 may be stored in a read command queue, a response to the read request of the host 400 may be delayed when read commands are continuously queued in the read command queue.

In an embodiment, the memory controller 200 may store, in a first read command queue, a first read command and a first physical address mapped to a logical address provided from the host 400, in response to a read request from the host 400. The memory controller 200 may compare physical addresses stored in the first read command queue. The memory controller 200 may compare a page number of a second physical address, which is scheduled in a first priority index number among index numbers of the first read command queue, with a page number of the first physical address. When the page number of the first physical address and the page number of the second physical address are the same, memory controller 200 may schedule the first physical address in the first priority index number among the index numbers of the first read command queue. The memory controller 200 may sequentially provide read commands and the physical addresses, which are stored in the first read command queue, to the memory device 100 according to a scheduled sequence.

In one embodiment, the memory controller 200 may generate a first read command in response to a read request provided from the host 400, translate a logical address provided from the host 400 into a first physical address, and store the first read command and a first physical address in the first read command queue. Also, the memory controller 200 may search for a first physical address group which includes at least one second physical address including a page number equal to that of the first physical address among physical addresses stored in the first read command queue and the first physical address in response to that a scheduling event has occurred. Also, the memory controller 200 may sequentially schedule, in consecutive index numbers of a second read command queue, a second physical address group including all physical address including a plane number different from all plane numbers of the first physical address group among the physical addresses stored in the first read command queue and the first physical address group.

In one embodiment, the memory controller 200 may store, in the first read command queue, a first read command instructing the memory controller 100 to perform a read operation and a first physical address, while a background operation is performed. Also, the memory controller 200 may store a second read command and a second physical address in the second read command queue in response to a read request provided from the host 400 while the background operation is performed. Also, the memory controller 200 may schedule the first physical address, the second physical address, and a second read command in a third read command queue according to a result obtained by comparing the first physical address and the second physical address. The number of physical addresses in a physical address group may be one or more, and the number of physical address groups may be one or more.

The scheduling event may occur after the resume command is provided to the memory device 100. For example, the scheduling event may occur in a period corresponding to that from a time at which the resume command is provided to the memory device 100 to a time at which the suspend command is provided to the memory device 100. The scheduling event may occur, for example, at a time at which the erase operation is completed or before the program operation (or write operation) is completed.

The memory controller 200 may include a command generation controller 210, a command storage 220, and a command schedule controller 230. A command generation controller 210 may generate a command in response to a request of the host 400. For example, the command generation controller 210 may generate a read command in response to a read request of the host 400. For example, the command generation controller 210 may generate a program command in response to a write request of the host 400. For example, the command generation controller 210 may generate an erase command in response to an erase request of the host 400. For example, the command generation controller 210 may generate a suspend command or a resume command.

The command generation controller 210 may translate a logical address provided from the host 400 to a physical address. In one embodiment, the command generation controller 210 may be implemented as a flash translation layer. The command generation controller 210 may provide the memory device 100 with a command and a physical address, which are stored in the command storage 220.

In an embodiment, the command generation controller 210 may provide an erase command to the memory device 100, provide a suspend command to the memory device 100 in response to a request provided by the host 400 during an erase operation, and provide a resume command to the memory device 100 when an operation corresponding to the request is completed. In an embodiment, after the resume command is provided to the memory device 100, the command generation controller 210 may provide a scheduling event signal to the command schedule controller 230. An embodiment will be described with reference to FIG. 5.

In one embodiment, the command generation controller 210 may provide the scheduling event signal to the command schedule controller 230 after a predetermined period elapses, measured from a time at which a command instructing the memory device 100 to perform an erase operation or a write operation is provided to the memory device 100. An embodiment will be described with reference to FIGS. 6 and 7.

The command storage 220 may store a command and a physical address. The command storage 220 may include at least one read command queue. For example, the command storage 220 may include one or more of a read command queue, a program command queue, or an erase command queue.

The command scheduling controller 230 may search at least one second physical address including a page number equal to that of a first physical address, among physical addresses stored in a first read command queue, in response to the scheduling event signal. The first physical address and the at least one second physical address may be in a first physical address group. The command schedule controller 230 may search for a second physical address group among the physical addresses stored in the first read command queue. The second physical address group may include all physical addresses including a plane number different from all plane numbers of the first physical address group. The command schedule controller 230 may sequentially schedule the first physical address group and the second physical address group, for example, in consecutive index numbers of a second read command queue.

In one embodiment, the storage device 1000 may include a buffer memory for storing data only while power is supplied from a power source. The buffer memory may be in memory controller 200. In one embodiment, the buffer memory may be outside and coupled to the memory controller 200. The buffer memory may be, for example, a volatile memory device, e.g., a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), and a Rambus Dynamic Random Access Memory (RDRAM).

The host 400 may communicate with the storage device 1000 through an interface. The interface may be implemented, for example, as a serial advanced technology attachment (SATA) interface, a SATA express (SATAe) interface, a serial attached small computer system interface (SAS) interface, a peripheral component interconnect express (PCIe) interface, a non-volatile memory express (NVMe) interface, an advanced host controller interface (AHCI) interface, or a multimedia card interface. However, the present disclosure is not limited thereto.

The host 400 may store data in the storage device 1000 or may communicate with the storage device 1000 to acquire data stored in the storage device 1000. In an embodiment, the host 400 may provide the storage device 1000 with a write request for requesting the storage device 1000 to store data. Also, the host 400 may provide the storage device 1000 with a write request, data, and a logical address for identifying the data.

The storage device 1000 may store write data (e.g., including the data provided by the host 400 and meta data) in the memory device 100 and may provide the host 400 with a response representing that the storing of the write data has been completed, in response to the write request from the host 400.

In an embodiment, the host 400 may provide the storage device 1000 with a read request for requesting the storage device 1000 to provide data stored in the storage device 1000 to the host 400. Also, the host 400 may provide the read request and a read address to storage device 1000.

The storage device 1000 may read, from the memory device 100, read data corresponding to the read address provided by the host 400 and may provide the host 400 with the read data as a response to the read request, in response to the read request provided from the host 400.

Figure 2:
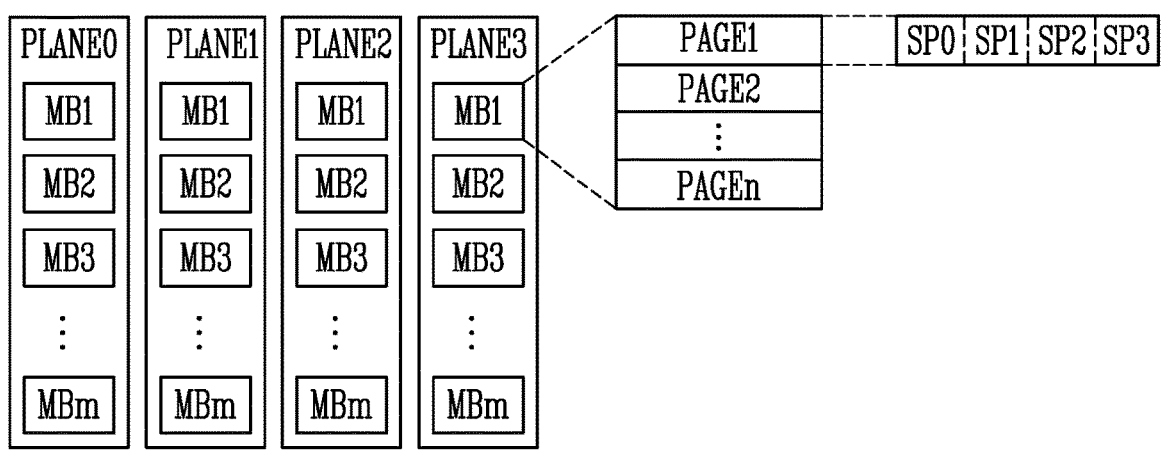
FIG. 2 illustrates an embodiment including a plurality of planes.

FIG. 2 is a diagram illustrating a plurality of planes PLANE0, PLANE1, PLANE2, and PLANE3 in accordance with an embodiment. The planes PLANE0, PLANE1, PLANE2, and PLANE3 may correspond, for example, to the planes 101, 102, 103, and 104 shown in FIG. 1.

Referring to FIG. 2, the planes PLANE0, PLANE1, PLANE2, and PLANE3 may be connected to one channel. In an embodiment, data output from each plane may be sequentially provided to the memory controller 200 through the one channel. For example, after data output from any one plane among the planes PLANE0, PLANE1, PLANE2, and PLANE3 is provided to the memory controller 200 through the one channel, data output from another one of the planes PLANE0, PLANE1, PLANE2, and PLANE3 may be provided to the memory controller 200 through the one channel.

Thus, in one embodiment, two or more planes may not simultaneously output data through the one channel.

Each of the planes PLANE0, PLANE1, PLANE2, and PLANE3 may include a plurality of memory blocks MB1, MB2, MB3, . . . , and MBm, where m is a natural number of 2 or more. In an embodiment, the memory blocks MB1, MB2, MB3, . . . , and MBm may include one or more system blocks and one or more user blocks. For example, a first memory block MB1 and a second memory bock MB2 may be system blocks and third to mth memory blocks MB3 to MBm may be user blocks.

A system block may store meta data including map data, validity data, uncorrectable error data, operation data, and the like. The map data may be data representing a mapping relationship between logical and physical addresses. The validity data may be data representing validity of data (or user data) provided from the host 400. The uncorrectable error data may be data representing that data (or user data) provided from the host 400 is data having an uncorrectable error. The operation data may be data representing whether a physical address stored in a command queue is an address translated from a logical address from the host 400 or an address generated to perform a background operation. However, the present disclosure is not limited thereto.

A user block may store data, for example, provided from the host 400 and meta data. A plurality of user blocks may be included.

Each of the memory blocks MB1, MB2, MB3, . . . , and MBm may include a plurality of pages PAGE1, PAGE2, . . . , and PAGEn, where n is a natural number of 2 or more. Each of the pages PAGE1, PAGE2, . . . , and PAGEn may be divided into virtual sub-pages SP0, SP1, SP2, and SP3 according to a read unit as a unit for performing a read operation. The read unit may be predetermined based on a size of the page and a number of the sub-pages. For example, when the size of the page 16 KB and the number of the sub-pages is 4, the read unit may be 4 KB. However, the present disclosure is not limited thereto. In one or more embodiments, the terms "sub-page," "slice," "section," and the like may have the same meaning.

In an embodiment, the physical address may include a plane number, a bock number, a page number, and a sub-page number. A plane number may indicate any one plane among the planes PLANE0, PLANE1, PLANE2, and PLANE3. A block number may indicate any one memory block among a plurality of memory blocks MB1, MB2, MB3, . . . , and MBm in one plane. A page number may indicate any one page among a plurality of pages PAGE1, PAGE2, . . . , and PAGEn in one memory block. A sub-page number may indicate one of sub-pages SP0 SP1, SP2, and SP3 in one page.

Figure 3:
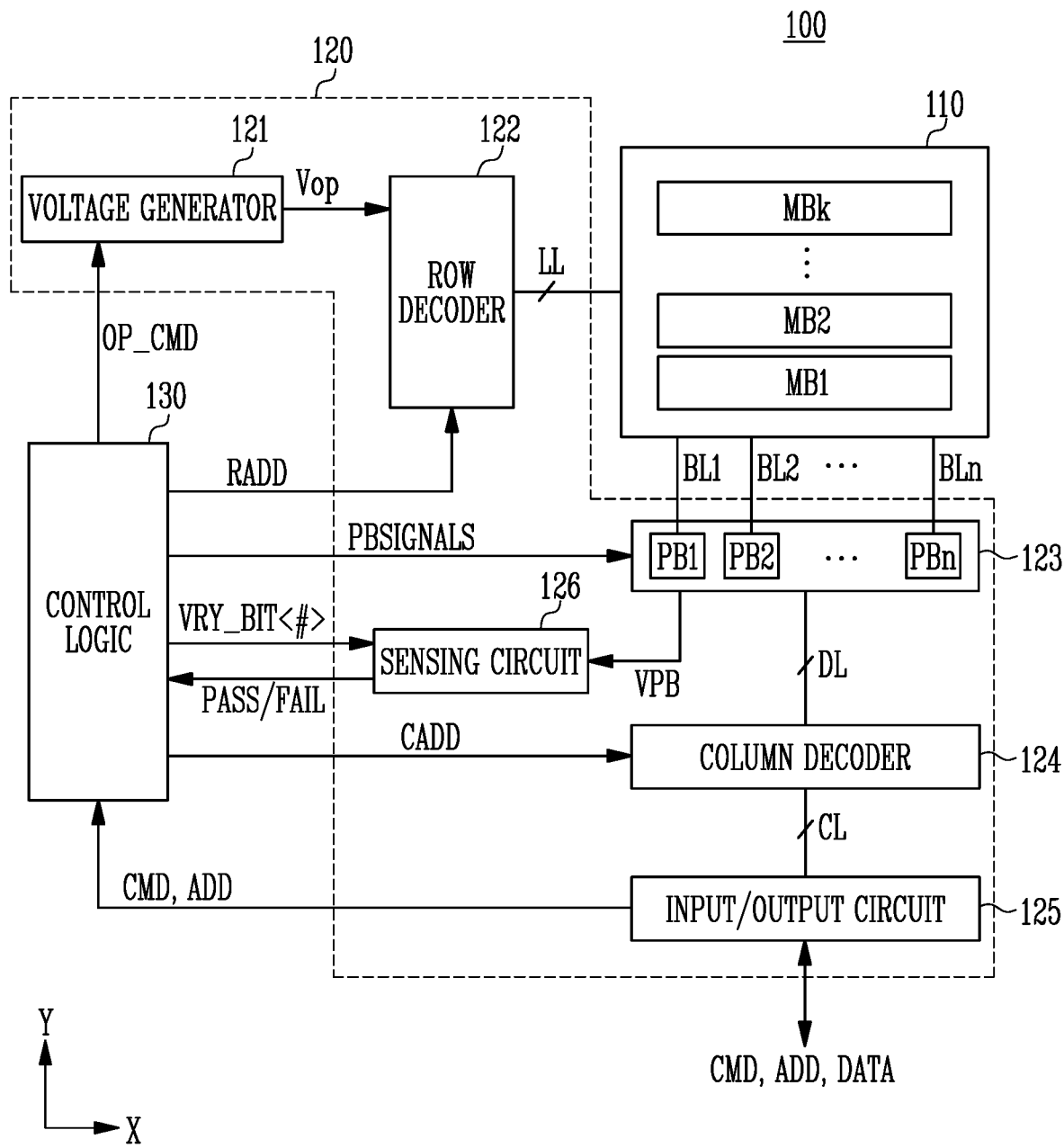
FIG. 3 illustrates an embodiment of a memory device.

FIG. 3 is a diagram illustrating an embodiment of memory device memory device 100, which may include a memory cell array 110, a peripheral circuit 120, and a control logic 130.

The memory cell array 110 may include a plurality of memory blocks MB1 to MBk (k is a positive integer). The number of memory blocks MB1 to MBk shown is merely an example and may be a different number in another embodiment.

Each of the memory blocks MB1 to MBk may be connected to local lines LL and bit lines BL1 to BLn (n is a positive integer). The local lines LL may be connected to a row decoder 122 and to each of the memory blocks MB1 to MBk. The local lines LL may include a first select line, a second select line, and a plurality of word lines arranged between the first select line and the second select line. The local lines LL may further include dummy lines arranged between the first select line and the word lines, dummy lines arranged between the second select line and the word lines, and pipe lines.

The bit lines BL1 to BLn may be commonly connected to the memory blocks MB1 to MBk.

The memory blocks MB1 to MBk may be implemented in a two-dimensional or three-dimensional structure. For example, memory cells in the memory blocks MB1 to MBk having the two-dimensional structure may be arranged in a direction parallel to a substrate. Memory cells in the memory blocks MB1 to MBk having the three-dimensional structure may, for example, be stacked in a direction vertical to a substrate.

The peripheral circuit 120 may include a voltage generator 121, the row decoder 122, a page buffer group 123, a column decoder 124, an input/output circuit 125, and a sensing circuit 126. The voltage generator 121 may generate various operating voltages Vop used for a program operation, a read operation, and an erase operation in response to an operation command OP_CMD. Also, the voltage generator 121 may selectively discharge the local lines LL in response to the operation command OP_CMD. For example, the voltage generator 121 may generate a program voltage, a verify voltage, pass voltages, a turn-on voltage, a read voltage, an erase voltage, a source line voltage, and the like under the control of the control logic 130.

In an embodiment, the voltage generator 121 may generate an internal power voltage by regulating external power voltage. The internal power voltage generated by the voltage generator 121 may be used as an operating voltage of the memory device 100.

In an embodiment, the voltage generator 121 may generate a plurality of voltages using the external power voltage or the internal power voltage. For example, the voltage generator 121 may include a plurality of pumping capacitors for receiving the internal power voltage, and may generate a plurality of voltages by selectively activating the pumping capacitors under control of the control logic 130. The generated voltages may be supplied to the memory cell array 110 by the row decoder 122.

The row decoder 122 may transfer the operating voltages Vop to the local lines LL in response to a row address RADD. The operating voltages Vop may be transferred to a selected memory block among the memory blocks MB1 to MBk through the local lines LL.

For example, in a program operation, the row decoder 122 may apply a program voltage to a selected word line, and apply a program pass voltage having a level lower than that of the program voltage to unselected word lines. In a program verify operation, the row decoder 122 may apply a verify voltage to the selected line, and apply a verify pass voltage higher than the verify voltage to the unselected word lines.

In a read operation, the row decoder 122 may apply a read voltage to the selected word line, and apply a read pass voltage higher than the read voltage to the unselected word lines.

In an erase operation, the row decoder 122 may select one memory block according to a decoded address. In the erase operation, the row decoder 122 may apply a reference (e.g., ground) voltage to word lines connected to the selected memory block.

The page buffer group 123 may include first to nth page buffers PB1 to PBn connected to the memory cell array 110 respectively through first to nth bit lines BL1 to BLn. The first to nth page buffers PB1 to PBn may operate under the control of the control logic 130. For example, the first to nth page buffers PB1 to PBn may operate in response to page buffer control signals PBSIGNALS. The first to nth page buffers PB1 to PBn may, for example, temporarily store data received through the first to nth bit lines BL1 to BLn, or sense a voltage or current of the bit lines BL1 to BLn in a read operation or a verify operation.

In a program operation, when the program voltage is applied to the selected word line, the first to nth page buffers PB1 to PBn may transfer data DATA received through the column decoder 124 and the input/output circuit 125 to selected memory cells through the first to nth bit lines BL1 to BLn. Memory cells of a selected page are programmed according to the transferred data DATA. A memory cell connected to a bit line to which a program allow voltage (e.g., a ground voltage) is applied may have an increased threshold voltage. A threshold voltage of a memory cell connected to a bit line to which a program inhibit voltage (e.g., a power voltage) is applied may be maintained.

In a verify operation, the first to nth page buffers PB1 to PBn may sense data stored in selected memory cells from the selected memory cell through the first to nth bit lines BL1 to BLn.

In a read operation, the first to nth page buffers PB1 to PBn may sense data DATA from memory cells of a selected page through the first to nth bit lines BL1 to BLn, and output the sensed data DATA to the input/output circuit 125 under the control of the column decoder 124.

In an erase operation, the first to nth page buffers PB1 to PBn may float the first to nth bit lines BL1 to BLn.

The column decoder 124 may transfer data between the input/output circuit 125 and the page buffer group 123 in response to a column address CADD. For example, the column decoder 124 may exchange data with the page buffers PB1 to PBn through data lines DL, or exchange data with the input/output circuit 125 through column lines CL.

The input/output circuit 125 may transfer a command CMD and an address ADD, which are transferred from the memory controller 200, to the control logic 130, or exchange data DATA to the column decoder 124.

In a read operation or a verify operation, the sensing circuit 126 may generate a reference current in response to an allow bit VRY_BIT<#>, and output a pass signal PASS or a fail signal FAIL by comparing a sending voltage VPB received from the page buffer group 123 with a reference voltage generated by the reference voltage.

The control logic 130 may control the peripheral circuit 120 by outputting the operation command OP_CMD, the row address RADD, the page buffer control signal PBSIGNALS, and the allow bit VRY_BIT<#> in response to the command CMD and the address ADD.

Figure 4:
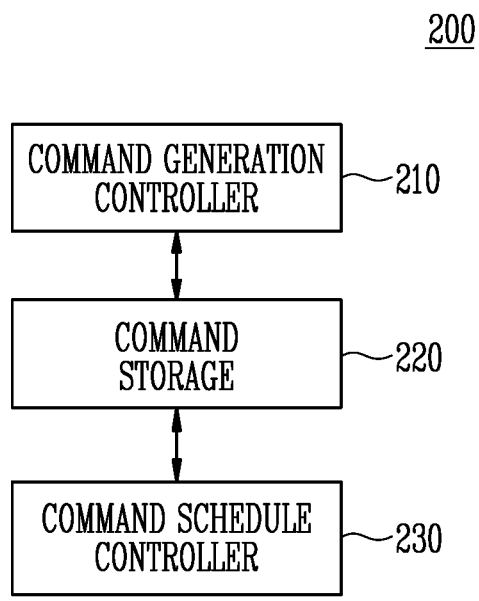
FIG. 4 illustrates an embodiment of a memory controller.

FIG. 4 is a diagram illustrating an embodiment of the memory controller 200, which may include a command generation controller 210, a command storage 220, and a command schedule controller 230.

Referring to FIG. 4, the command generation controller 210 may receive a read request from the host 400. The command generation controller 210 may generate a first read command instructing the memory device to read data stored in the memory device in response to the read request. The first read command may be generated in response to the read request currently provided by the host 400.

The command generation controller 210 may translate a logical address provided from the host 400 to a first physical address. The first physical address may be a physical address to be provided together with the first read command. In one embodiment, the first physical address may be a physical address to be provided together with a read command stored in the command storage 220.

The command generation controller 210 may provide the first read command and the first physical address to the command storage 220. The command generation controller 210 may generate a scheduling event signal, and provide the scheduling event signal to the command schedule controller 230. The command storage 220 may store read commands and physical addresses. The read commands and the physical addresses, which are stored in the command storage 220, may be generated before the first read command and the first physical address are generated.

In an embodiment, the command storage 220 may include a first read command queue and a second read command queue. The first read command queue may store read commands and physical addresses before a scheduling event occurs. The second read command queue may be a read command queue in which the read commands and the physical addresses are realigned and stored, after the scheduling even occurs.

The command schedule controller 230 may search for a first physical address group and a second physical address group among the physical addresses stored in the first read command queue. The command schedule controller 230 may schedule the first physical address group and the second physical address group in the second read command queue.

Figure 5:
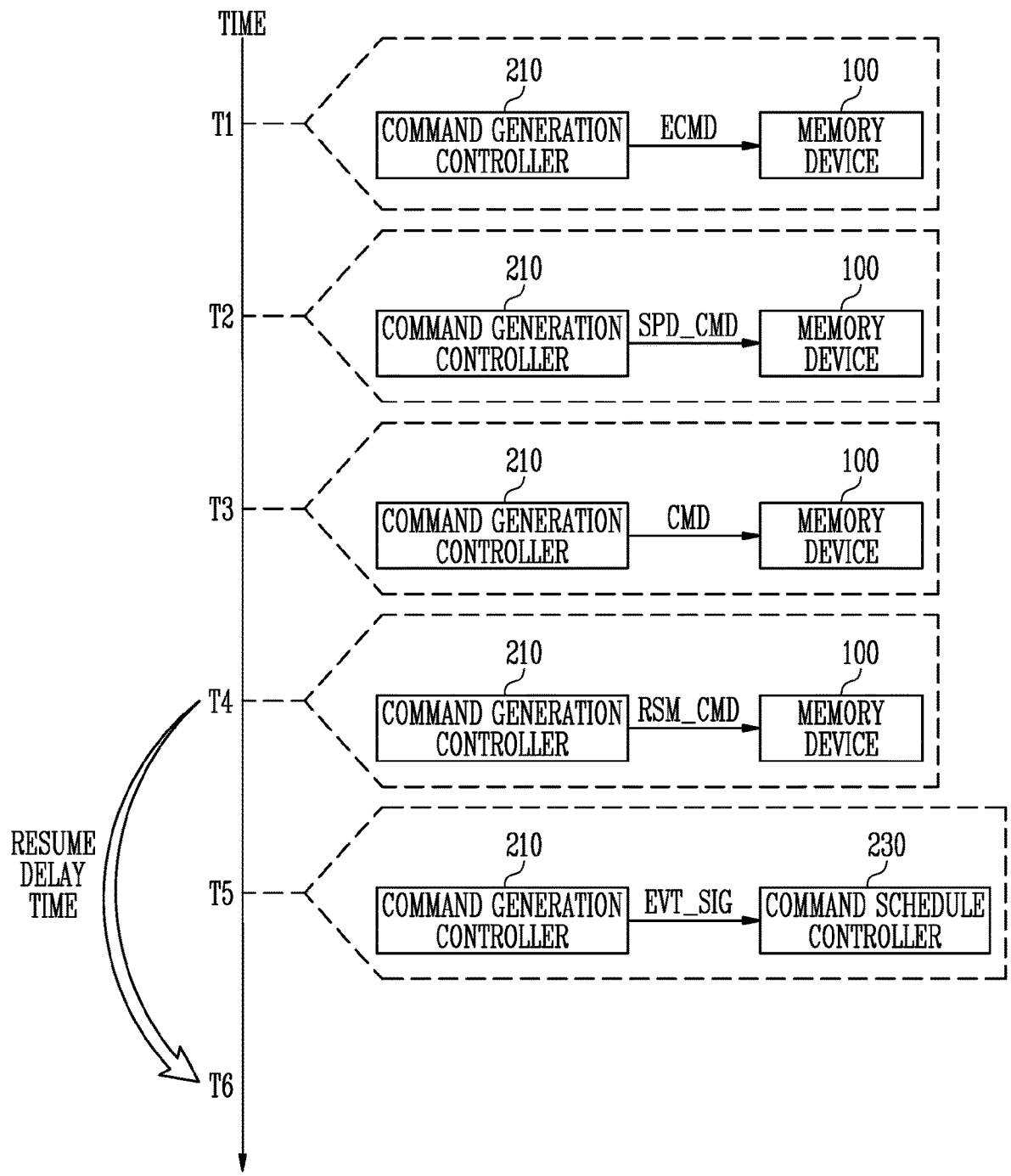
FIG. 5 illustrates an embodiment of providing a scheduling event signal.

FIG. 5 is a diagram illustrating an embodiment of an operation of providing a scheduling event signal. Referring to FIG. 5, at time T1, the command generation controller 210 may provide an erase command ECMD to the memory device 100. The memory device 100 may start an erase operation in response to the erase command ECMD.

At time T2, the host 400 may provide a request to the command generation controller 210. The request of the host 400 may be, for example, a write request or a read request. The command generation controller 210 may provide a suspend command SPD_CMD to the memory device 100. The memory device 100 may suspend the erase operation started at the time T1 in response to the suspend command SPD_CMD.

At time T3, the command generation controller 210 may provide the memory device 100 with a command CMD corresponding to the request of the host 400, which is provided at the time T2. When the request of the host 400 is the write request, the command CMD may be a program command. In one embodiment, when the request of the host 400 is the read request, the command CMD may be a read command. The memory device 100 may perform an operation instructed by the command CMD in response to the command CMD.

At time T4, the memory device 100 may complete the operation instructed by the command CMD. The command generation controller 210 may provide a resume command RSM_CMD to the memory device 100. The memory device 100 may resume the erase operation suspended at the time T2 in response to the resume command RSM_CMD. A certain preparation time may be included for the memory device 100 to normally perform the erase operation. This preparation time may be referred to as a resume delay time. For example, when the erase operation is resumed at time T4, the erase operation may be normally performed from T6 after the resume delay time elapses.

During the resume delay time, the host 400 may provide a read request to the command generation controller 210. A read command and a physical address may be sequentially stored in the first read command queue included in the command storage 220, whenever the read request of the host 400 is provided to the command generation controller 210. When read commands and physical addresses, which are stored in the first read command queue, are continuously queued in the first read command queue, a response to the read request of the host 400 may be delayed.

In an embodiment, at a time T5 after the resume command RSM_CMD is provided to the memory device 100, the command generation controller 210 may provide a scheduling event signal EVT_SIG to the command schedule controller 230.

Figure 6:
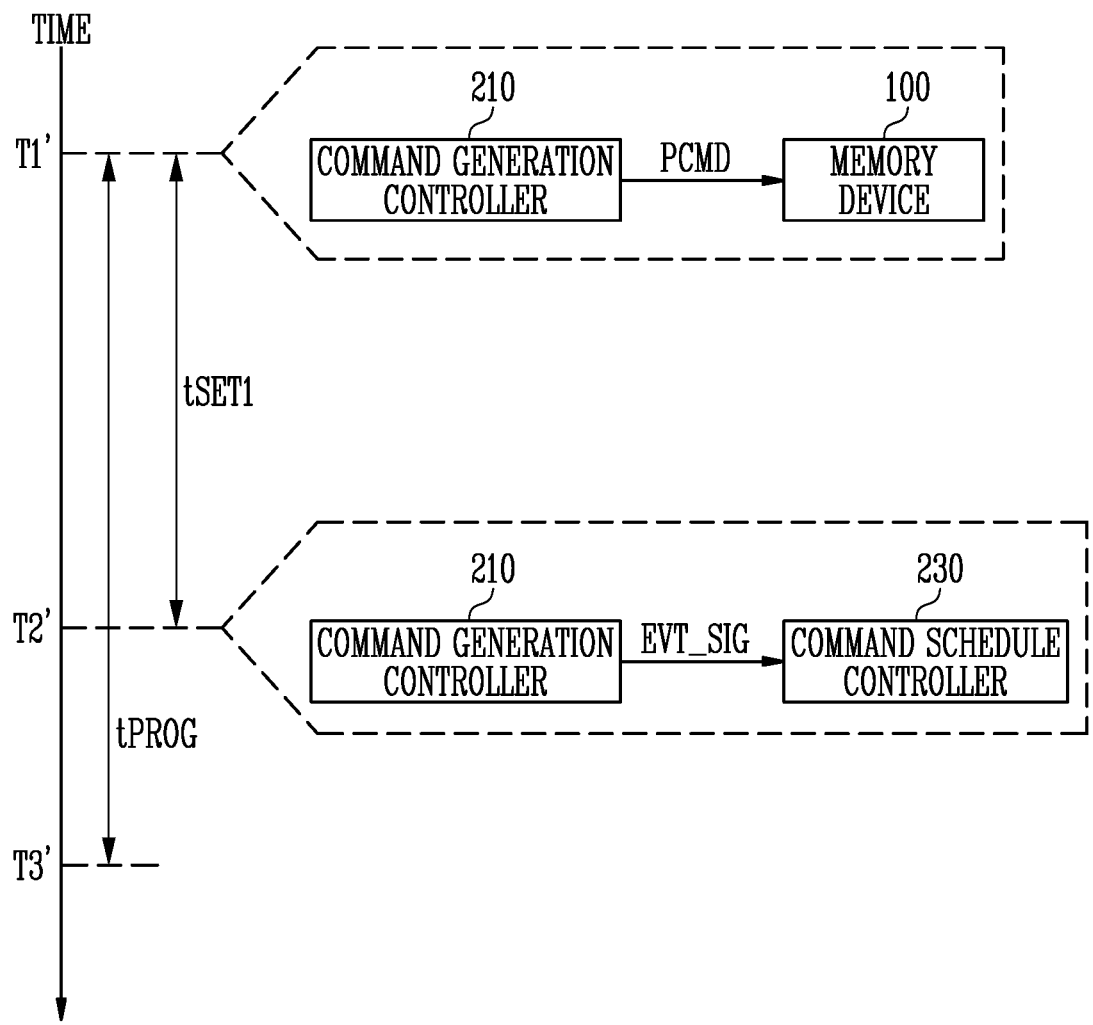
FIG. 6 illustrates an embodiment of providing a scheduling event signal.

FIG. 6 is a diagram illustrating an embodiment of an operation of providing the scheduling event signal.

Referring to FIG. 6, the command generation controller 210 may not generate the suspend command SPD_CMD and the resume command RSM_CMD. After a predetermined period elapses from when the command CMD shown in FIG. 5 is provided to the memory device 100, the command generation controller 210 may output the scheduling event signal EVT_SIG.

At time T1', the command generation controller 210 may provide a program command PCMD to the memory device 100. The memory device 100 may start a program operation (or write operation) in response to the program command PCMD. A time may be included for the program operation to be normally completed. This time may be referred to as a program operation time tPROG. Information (or data) on the program operation time tPROG may be stored in a memory block allocated as a CAM block among a plurality of memory blocks MB1, MB2, MB3, . . . , and MBm in the memory device 100. The memory controller 200 may acquire the information on the program operation time tPROG from the memory device 100 in booting. The program operation time tPROG may be, for example, a period corresponding to that from the time T1' to a time T3'.

Before the program operation time tPROG elapses after a time at which the program command PCMD is provided to the memory device 100, the command generation controller 210 may provide the scheduling event signal EVT_SIG to the command schedule controller 230.

In an embodiment, at a time at which a predetermined first reference time tSET1 elapses after the time at which the program command PCMD is provided to the memory device 100, the command generation controller 210 may provide the scheduling event signal EVT_SIG to the command schedule controller 230. For example, the time at which the predetermined first reference time tSET1 elapses after the time T1' may be T2'. Information (or data) on the first reference time tSET1 may be stored in the memory block allocated as the CAM block among the plurality of memory blocks MB1, MB2, MB3, . . . , and MBm in the memory device 100. The memory controller 200 may acquire the information on the first reference time tSET1 from the memory device 100 in booting. In an embodiment, the first reference time tSET1 may be shorter than the program operation time tPROG.

At time T3', the command generation controller 210 may provide the memory device 100 with a command for checking a result of the program operation.

Figure 7:
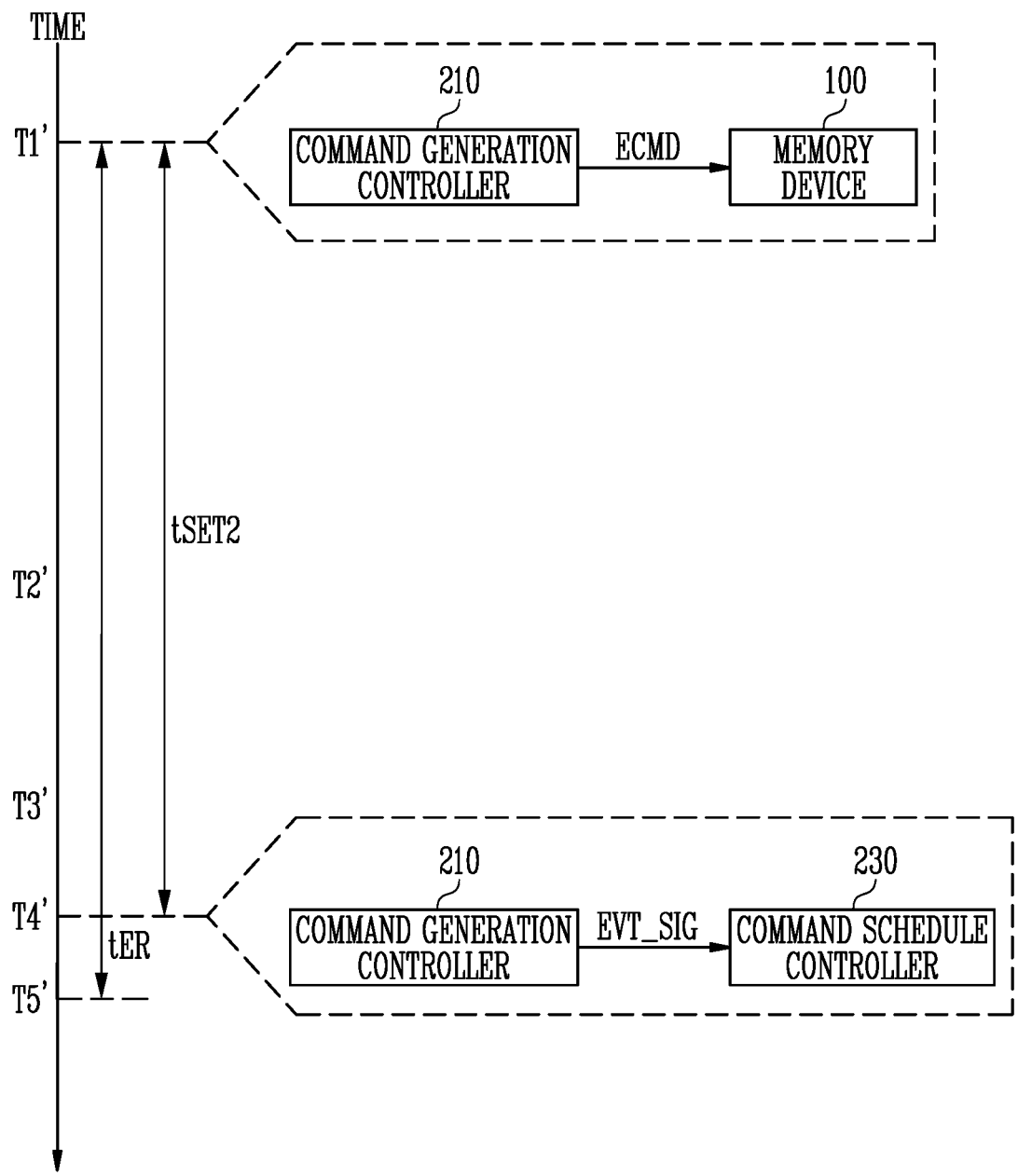
FIG. 7 illustrates an embodiment of providing the scheduling event signal.

FIG. 7 is a diagram illustrating an embodiment of an operation of providing the scheduling event signal.

Referring to FIG. 7, at time T1', the command generation controller 210 may provide an erase command ECMD to the memory device 100. The memory device 100 may start an erase operation in response to the erase command ECMD.

A time may be included for the erase operation to be normally completed may be an erase operation time tER. Information (or data) on the erase operation time tER may be stored in a memory block allocated as a CAM block among a plurality of memory blocks MB1, MB2, MB3, . . . , and MBm in the memory device 100. The memory controller 200 may acquire the information on the erase operation time tER from the memory device 100 in booting. The erase operation time tER may be, for example, a period corresponding to that from the time T1' to a time T5'. In one embodiment, the erase operation time tER may be longer than the program operation time tPROG shown in FIG. 6.

Before the erase operation time tER elapses after a time at which the erase command ECMD is provided to the memory device 100, the command generation controller 210 may provide the scheduling event signal EVT_SIG to the command schedule controller 230.

In an embodiment, at a time at which a predetermined second reference time tSET2 elapses after the time at which the erase command ECMD is provided to the memory device 100, the command generation controller 210 may provide the scheduling event signal EVT_SIG may be provided to the command schedule controller 230. For example, the time at which the predetermined second reference time tSET2 elapses after the time T1' may be T4'.

Information (or data) on the second reference time tSET2 may be stored in the memory block allocated as the CAM block among the plurality of memory blocks MB1, MB2, MB3, . . . , and MBm in the memory device 100. The memory controller 200 may acquire the information on the second reference time tSET2 from the memory device 100 in booting. In an embodiment, the second reference time tSET2 may be shorter than the erase operation time tER. In an embodiment, the second reference time tSET2 may be equal to the first reference time tSET1 or be longer than the first reference time tSET1.

FIG. 8 is a diagram illustrating an embodiment of the command storage the command storage 220, which may include a first read command queue 221 and a second read command queue 222.

The first read command queue 221 may sequentially store a read commands RCMD and physical addresses Physical Address based on index number. For example, a physical address including plane number 0 P0, block number 100 BLK100, page number 30 PG30, sub-page numbers 0 to 3 S0 to S3, and a read command RCMD1 may be stored in index number 0 Index0 of the first read command queue 221.

A physical address including plane number 0 P0, block number 200 BLK200, page number 10 PG10, sub-page number 3 S3, and a read command RCMD2 may be stored in index number 1 Index1 of the first read command queue 221.

A physical address including plane number 1 P1, block number 301 BLK301, page number 50 PG50, sub-page numbers 0 and 3 S0 and S3, and a read command RCMD3 may be stored in index number 2 Index2 of the first read command queue 221.

A physical address including plane number 3 P3, block number 903 BLK903, page number 75 PG75, sub-page number 1 S1, and a read command RCMD4 may be stored in index number 3 Index3 of the first read command queue 221.

The read commands RCMD1, RCMD2, RCMD3, and RCMD4 and the physical addresses, which are respectively stored in standby columns for Index0, Index1, Index2, and Index3 of the first read command queue 221, may be sequentially provided to the memory device 100. For example, the read commands RCMD1, RCMD2, RCMD3, and RCMD4 and corresponding ones of the physical addresses may be sequentially provided according to a predetermined order, e.g., beginning with a lowest number of the standby columns Index0, Index1, Index2, and Index3 of the first read command queue 221. The predetermined order may be a different order in another embodiment. The second read command queue 222 may be empty before a scheduling event occurs.

FIG. 9 is a diagram illustrating an embodiment of an operation of storing read commands and corresponding physical addresses in the first read command queue.

Referring to FIG. 9, while the read commands RCMD1, RCMD2, RCMD3, and RCMD4 and the physical addresses are respectively stored in the standby columns Index0, Index1, Index2, and Index3 of the first read command queue 221, the command generation controller 210 may store, in the first read command queue 221, a physical address mapped to a logical address and a read command, for example, as provided from the host 400. For example, a physical address including plane number 1 P1, block number 201 BLK201, page number 30 PG30, sub-page number 2 S2, and a read command may be stored in index number Index4 of the first read command queue 221.

In one embodiment, commands and physical addresses stored in a command queue may be output according to the first-in first-out (FIFO) scheme. For example, the physical address and read command RCMD1 stored in index number 0 Index0 of the first read command queue 221 may be output first. The physical address and read command RCMD2 stored in index number 1 Index1 of the first read command queue 221 may be output next, and so on.

Figure 10:
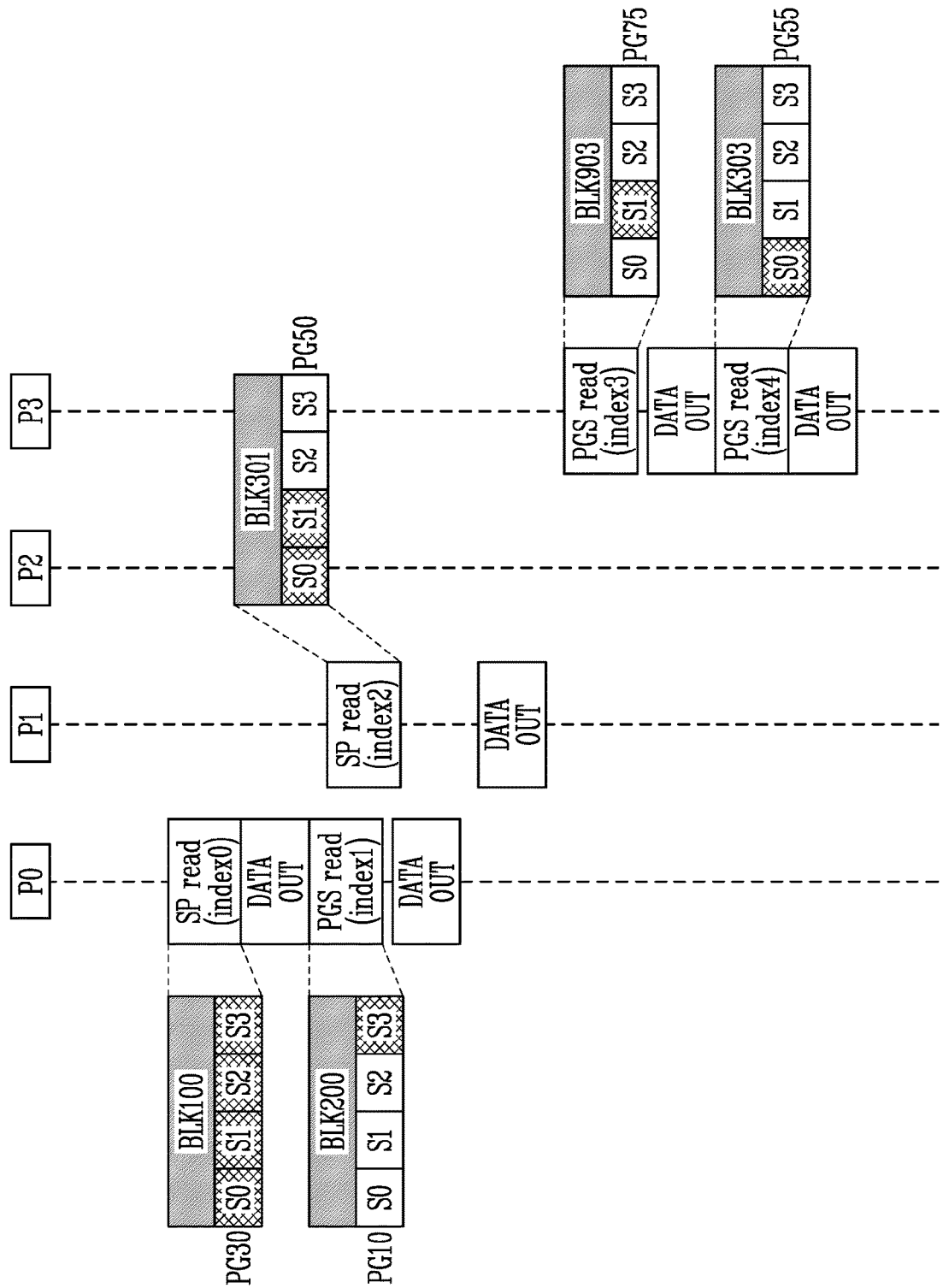
FIG. 10 illustrates an embodiment of a read operation.

FIG. 10 is a diagram illustrating an embodiment of a read operation performed, for example, in accordance with the embodiment of FIG. 9.

Referring to FIGS. 9 and 10, the physical address and read command RCMD1 stored in index number 0 Index0 of the first read command queue 221 may be provided to the memory device 100. The memory device 100 may perform a read operation on a page of a single plane (e.g., zeroth plane 101) having the physical address including plane number 0 P0, block number 100 BLK10, page number 30 PG30, and sub-page number 0 S0 in response to the read command RCMD1. The read operation performed on the page of the single plane may be referred to as a single plane read operation SP read. Data according to the single plane read operation SP read may be output (DATA OUT). The output data may be provided to the memory controller 200 through the channel.

Next, the read command RCMD2 and physical address stored in index number 1 Index1 of the first read command queue 221 may be provided to the memory device 100. The memory device 100 may perform a read operation PGS read on a sub-page corresponding to the physical address including plane number 0 P0, block number 200 BLK200, page number 10 PG10, and sub-page number 3 S3 in response to the read command RCMD2. Data stored in the sub-page may be output by the read operation PGS read (DATA OUT).

After the read command RCMD2 stored in index number 1 Index1 of the first read command queue 221 is provided to the memory device 100, the read command RCMD3 and physical address stored in index number 2 Index2 of the first read command queue 221 may be provided to the memory device 100. The memory device 100 may perform a single plane read operation SP read on a page of a single plane (e.g., first plane 102) having the physical address including plane number 1 P1, block number 301 BLK301, page number 50 PG50, and sub-page numbers 0 and 1 S0 and S1 in response to the read command RCMD3.

Since the plane number of the physical address stored in index number 1 Index 1 of the first read command queue 221 and the plane number of the physical address stored in index number 2 Index 2 of the first read command queue 221 are different from each other, the memory device 100 may perform a read operation on the zeroth plane 101 having plane number 0 P0 and first plane 102 having the plane number 1 P1 using the plane interleaving scheme. For example, the read operation PGS read on the zeroth plane 101 and the single plane read operation SP read on the first plane 102 may partially overlap with each other.

Data to be output by the single plane read operation SP read performed on the first plane 102 is output after data output by the read operation PGS read performed on the zeroth plane 101 is provided to the memory controller 200. The reason is that a plurality of planes (e.g., planes 101 to 104 shown in FIG. 1 or planes PLANE0, PLANE1, PLANE2, and PLANE3 shown in FIG. 2) are connected to one channel.

Next, the read command RCMD4 and physical address stored in index number 3 Index3 of the first read command queue 221 may be provided to the memory device 100. The memory device 100 may perform a read operation PGS read on a sub-page corresponding to the physical address including plane number 3 P3, block number 903 BLK903, page number 75 PG75, and sub-page number 1 S1 in response to the read command RCMD4. Data stored in the sub-page may be output by the read operation PGS read (DATA OUT).

Next, the read command and physical address stored in index number 4 Index4 of the first read command queue 221 may be provided to the memory device 100. The memory device 100 may perform a read operation PGS read, and data stored in a sub-page may be output by the read operation PGS read (DATA OUT).

The read commands and physical addresses stored in the first read command queue 221 may be ones queued while the memory device 100 performs the erase operation, for example, as described above with reference to FIG. 5. The read commands and physical addresses may continuously stand by in the respective index numbers of the first read command queue 221, until an operation currently performed in the memory device 100 is completed. Accordingly, a time (or a read busy time tR) for which a read operation on a read request of the host 400 is performed is increased, the performance of the read operation is decreased, and a read response to the read request of the host 400 is delayed.

In order to alleviate this concern, the first read command queue 221 may be scheduled again according to whether the physical addresses stored in the first read command queue 221 are to be provided to the memory device 100 according to a specific output sequence.

Figure 11:
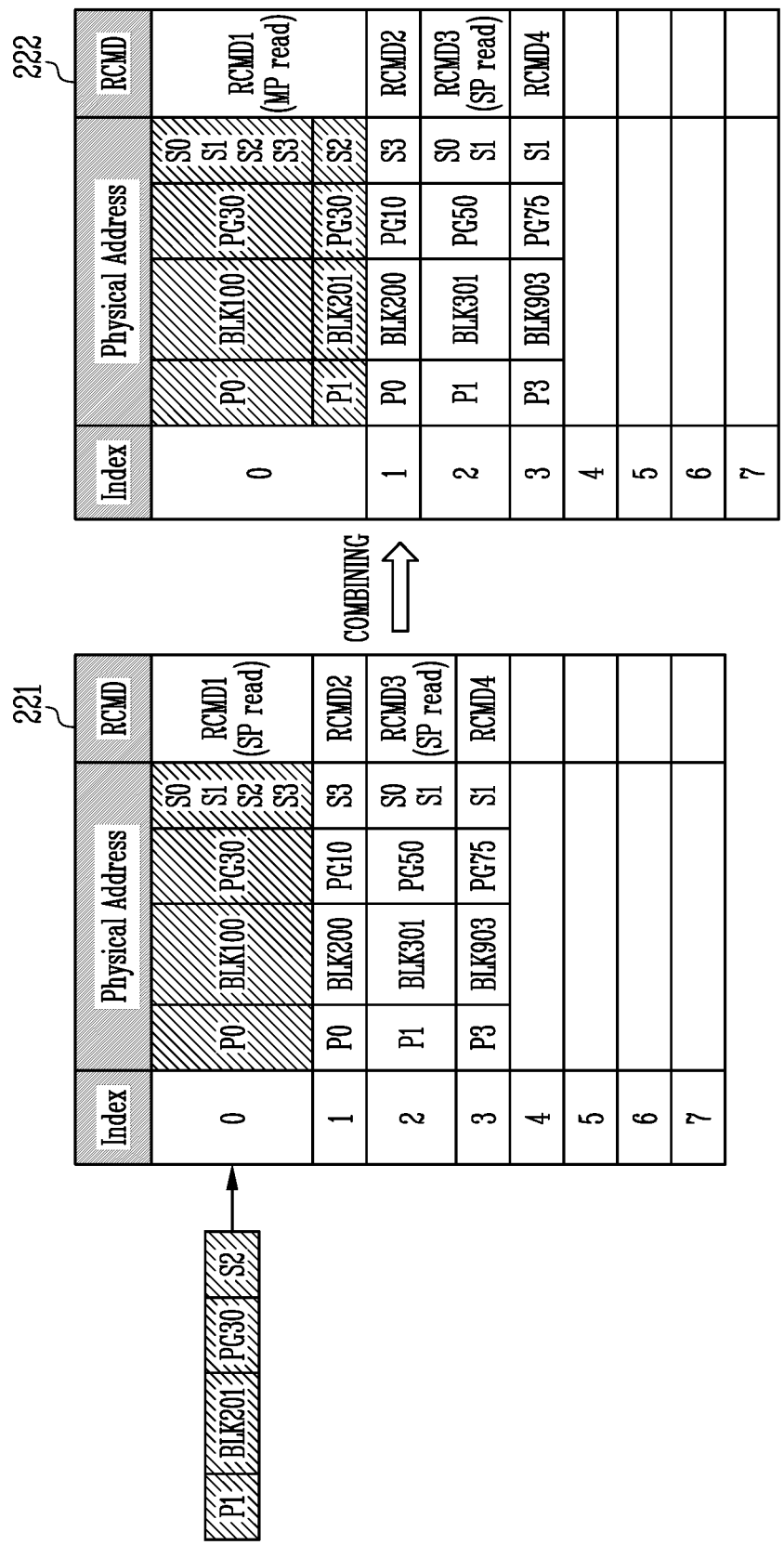
FIG. 11 illustrates an embodiment of scheduling read commands and physical addresses, which are stored in the one read command queue, in another read command queue.

FIG. 11 is a diagram illustrating an embodiment of an operation of scheduling the read commands and physical addresses, which are stored in the first read command queue, in the second read command queue. For purposes of illustration, in FIG. 11, it is assumed that a first physical address is the physical address including plane number 1 P1, block number 201 BLK201, page number 30 PG30, and sub-page number 2 S2.

Referring to FIG. 11, the command schedule controller 230 may search for at least one second physical address including a page number equal to that of the first physical address among the physical addresses stored in the first read command queue 221. In an embodiment, the first physical address and the at least one second physical address may be physical addresses having different plane numbers. For example, the physical address stored in index number 0 Index0 of the first read command queue 221 may be a physical address having a plane number different from that of the first physical address and/or a page number different from that of the first physical address.

The command schedule controller 230 may schedule a first read command, at least one second read command corresponding to the at least one second physical address, and a first physical address group in any one index number among index numbers of the second read command queue 222. For example, the physical address stored in index number 0 Index0 of the first read command queue 221 and the first physical address may be scheduled in index number 0 Index0 of second read command queue 222.

A first read command corresponding to the first physical address and a second read command corresponding to the physical address stored in index number 0 Index0 of first read command queue 221 may also be scheduled in index number 0 Index0 of second read command queue 222.

A read command RCMD1 stored in index number 0 Index0 of the second read command queue 222 may include the first read command and the second read command. Index number 0 Index0 of the second read command queue 222 may be a first priority index number.

In one embodiment, the first physical address and the at least one second physical address may have the same plane number and/or the same block number. The command schedule controller 230 may schedule the first physical address group in any one index number among the index numbers of the second read command queue 222. Also, the command schedule controller 230 may schedule the first read command or the at least one second read command corresponding to the at least one second physical address in one index number among the index numbers of second read command queue 2222.

In one embodiment, when any physical address including a page number equal to that of the first physical address (among the physical addresses stored in the first read command queue 221) does not exist, the first physical address may be scheduled in index number 4 Index4 of the second read command queue 222, for example, as shown in FIG. 9.

Figure 12:
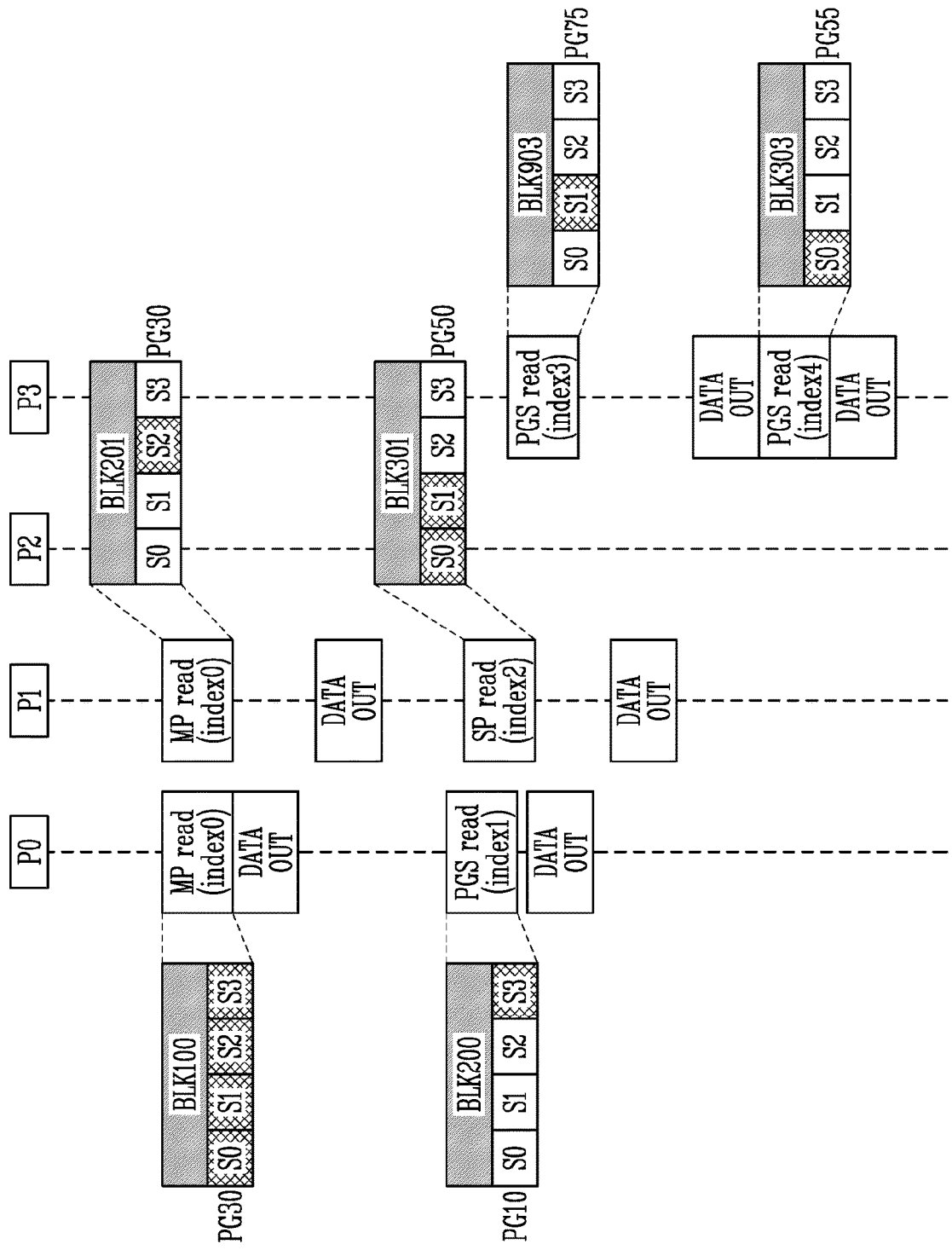
FIG. 12 illustrates an embodiment of a read operation.

FIG. 12 is a diagram illustrating an embodiment of a read operation performed in accordance with the embodiment shown in FIG. 11.

Referring to FIGS. 11 and 12, the read command RCMD1 and the physical addresses, which are stored in the index number 0 Index0 of the second read command queue 222 may be provided to the memory device 100. The memory device 100 may simultaneously perform a read operation MP read on pages of each of planes having the physical addresses stored in the index number 0 Index0 of the second read command queue 222 in response to the read command RCMD1. The read operation simultaneously performed on the pages of each of the planes may be defined as a multi-plane read operation MP read.

Data may be output by a multi-plane read operation MP read performed on the zeroth plane 101 (DATA OUT). Next, data may be output by a multi-plane read operation MP read performed on the first plane 102 (DATA OUT).

The read command and physical address stored in each of the index number 1 Index1, the index number 2 Index2, and an index number 3 Index3 of the second read command queue may be sequentially provided to the memory device 100, and the memory device 100 may sequentially perform a read operation in response to each read command. This has been described above with reference with FIG. 10.

As described above, since a read command queue is realigned, a number of times all sensing operations for a read operation on a read request of the host 400 are performed can be decreased. As a result, a phenomenon in which a response to the read request of the host 400 is delayed can be reduced or prevented, and thus performance of the read operation can be increased.

Figure 13:
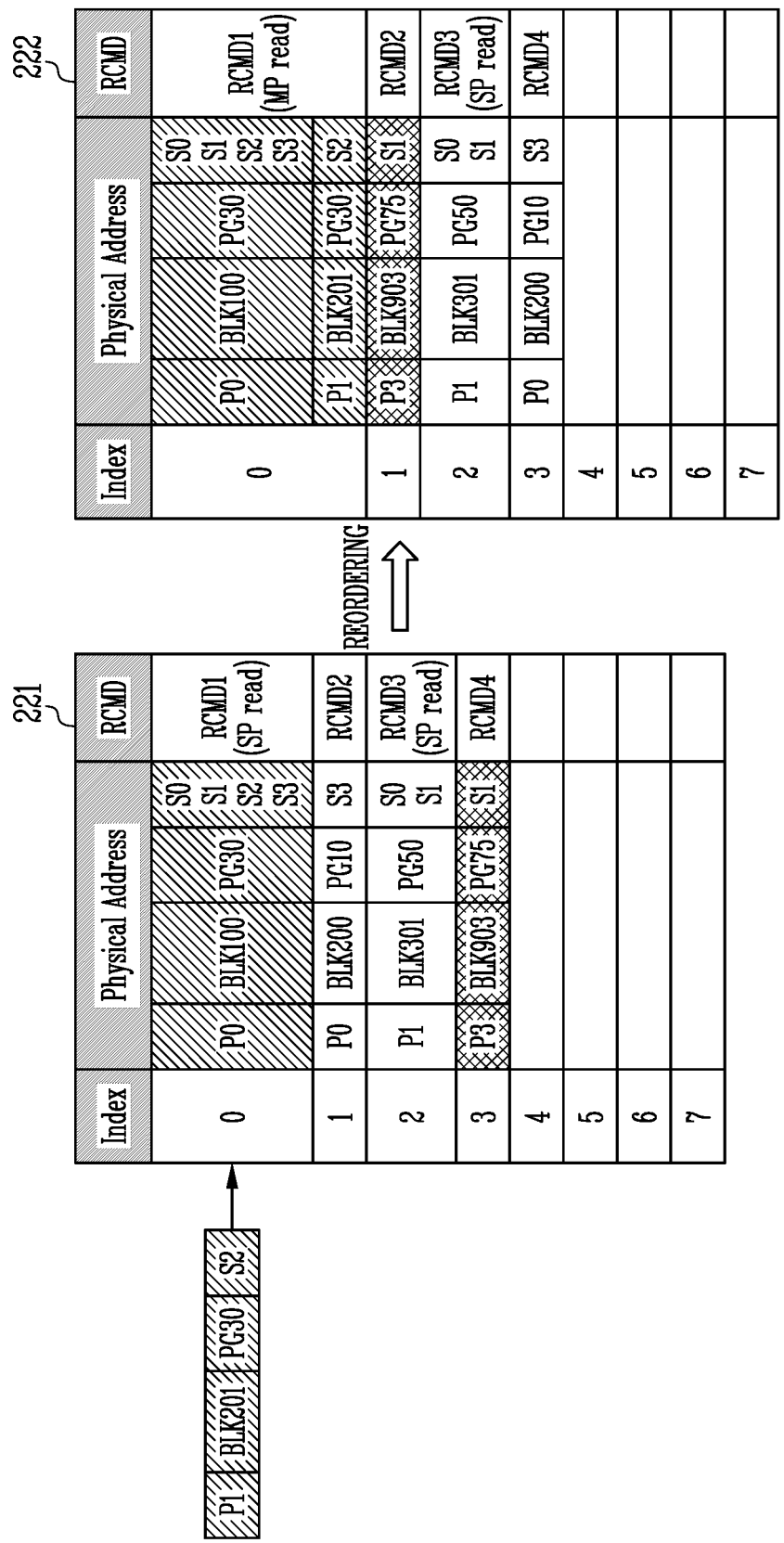
FIG. 13 illustrates an embodiment of scheduling read commands and physical addresses, which are stored in one read command queue, in another read command queue.

FIG. 13 is a diagram illustrating an embodiment of an operation of scheduling read commands and physical addresses, which are stored in the first read command queue, in the second read command queue. For purposes of illustration, it is assumed that a first physical address is the physical address including plane number 1 P1, block number 201 BLK201, page number 30 PG30, and sub-page number 2 S2.

Referring to FIG. 13, as described above with reference to FIG. 11, the physical address stored in index number 0 Index0 of the first read command queue 221 and the first physical address may be scheduled in index number 0 Index0 of the second read command queue 222. A first read command corresponding to the first physical address and a second read command corresponding to the physical address stored in index number 0 Index0 of the first read command queue 221 may also be scheduled in index number 0 Index0 of second read command queue 222.

In an embodiment, the command schedule controller 230 may search for a second physical address group among the physical addresses stored in the first read command queue 221. Also, the command schedule controller 230 may sequentially schedule a first physical address group and the second physical address group in consecutive index numbers of the second read command queue 222. For example, the physical address stored in index number 3 Index3 of the first read command queue 221 may be included in the second physical address group.

When the first physical address group is stored in index number 0 Index0 of the second read command queue 222, the physical address and read command stored in index number 3 Index3 of the first read command queue 221 may be scheduled in index number 1 Index1 of the second read command queue 222. The number of read commands RCMD2 stored in index number 1 Index1 of second read command queue 222 may be one.

The physical address and read command stored in index number 1 Index1 of the first read command queue 221 may be scheduled in index number 3 Index3 of the second read command queue 222.

The physical address and read command stored in index number 2 Index2 of the first read command queue 221 may be scheduled in index number 2 Index2 of the second read command queue 222.

Figure 14:
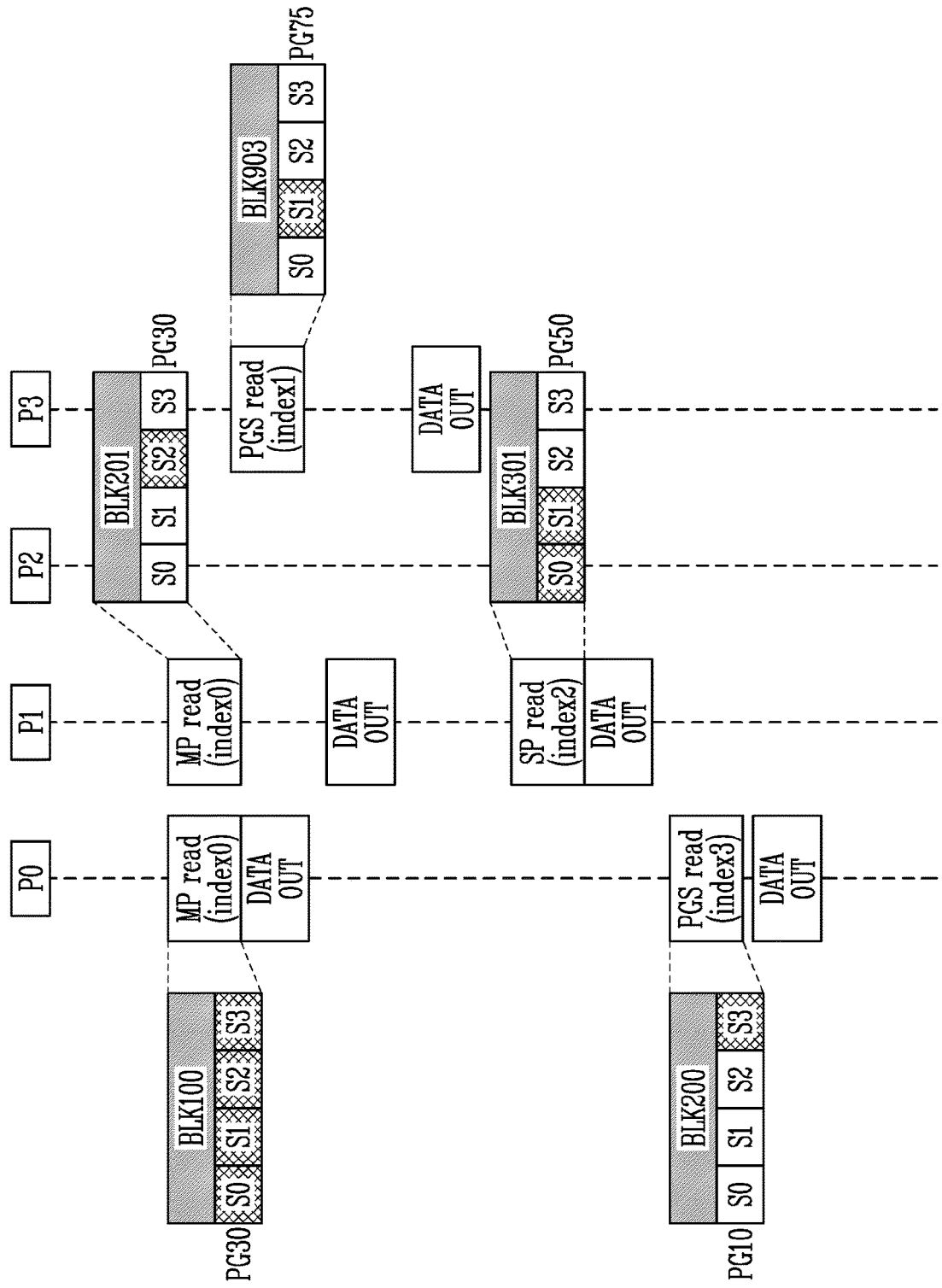
FIG. 14 illustrates an embodiment of a read operation.

FIG. 14 is a diagram illustrating an embodiment of a read operation performed in accordance with the embodiment shown in FIG. 13.

Referring to FIGS. 13 and 14, a read command RCMD1 and physical addresses, which are stored in the index number 0 Index0 of the second read command queue 222, may be provided to the memory device 100. The memory device 100 may perform a multi-plane read operation MP read. Data may be sequentially output by the multi-plane read operation MP read (DATA OUT).

After the read command RCMD1 stored in the index number 0 Index0 of the second read command queue 222 is provided to the memory device 100, a read command RCMD2 and a physical address, which are stored in the index number 1 Index1 of the second read command queue 222, may be provided to the memory device 100. The memory device 100 may perform a read operation PGS read.

The memory device 100 may perform a read operation on each of the zeroth plane 101 having the plane number 0 P0, the first plane 102 having the plane number 1 P1, and the second plane 103 having the plane number 3 P3 using the plane interleaving scheme. Thus, the multi-plane read operation MP read and the read operation PGS read may partially overlap with each other.

Data according to the read operation PGS read may be output, after data according to the multi-plane read operation MP read are sequentially output (DATA OUT).

When a read command RCMD3 and physical addresses, which are stored in the index number 2 Index2 of the second read command queue 222, may be provided to the memory device 100, the memory device 100 may perform a read operation PGS read, and data according to the read operation PGS read may be output.

When a read command RCMD4 and a physical address, which are stored in the index number 3 Index3 of the second read command queue 222, are provided to the memory device 100, the memory device 100 may perform a read operation PGS read, and data according to the read operation PGS read may be output.

As described above, since a read command queue is realigned, a number of times all sensing operations required to perform a read operation on a read request of the host 400 are performed can be decreased, a phenomenon in which a response to the read request of the host 400 is delayed can be prevented, and the performance of the read operation can be increased.

FIG. 15 is a diagram illustrating an embodiment of the command storage 220, which may include a first read command queue 221', a second read command queue 222', and a third read command queue 223'.

The first read command queue 221' may be a read command queue in which a first read command instructing the memory device 100 to perform a read operation while a background operation is performed and a first physical address are stored. For example, the first physical address stored in the first read command queue 221' may include the plane number 0 P0, the block number 100 BLK100, a page number 5 PG5, the sub-page number 0 S0, and the sub-page number 1 S1. The first read command BRCMD1 may be a command instructing the memory device 100 to read valid data included in a victim block in a garbage collection operation. However, the present disclosure is not limited thereto.

The second read command queue 222' may be the same as the first read command queue 221 described above with reference to FIG. 8. In one embodiment, the second read command queue 223' may be the same as the second read command queue 222 described above with reference to FIG. 8.

Figure 16:
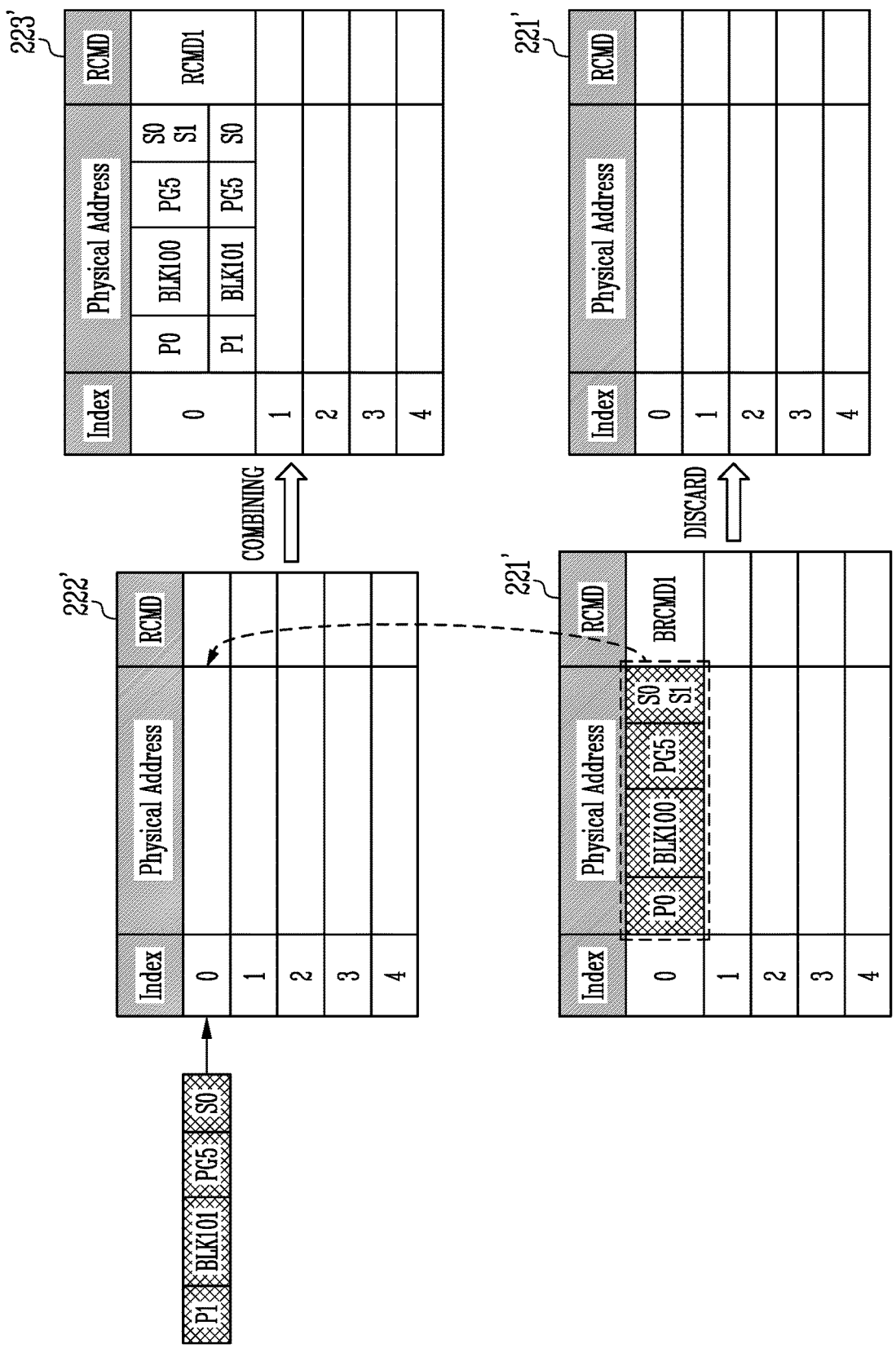
FIG. 16 illustrates an embodiment of scheduling a read command and a physical address.

FIG. 16 is a diagram illustrating an embodiment an operation of scheduling a read command and a physical address.

Referring to FIG. 16, a first read command instructing the memory device 100 to perform a read operation while a background operation is performed and a first physical address may be stored in the first read command queue 221'. The first physical address may include the plane number 0 P0, the block number 100 BLK100, the page number 5 PG5, the sub-page number 0 S0, and the sub-page number 1 S1.

While the background operation is performed, the host 400 may provide a read request to the command generation controller 210.

The command generation controller 210 may generate a second read command in response to the read request of the host 400. The command generation controller 210 may translate a logical address provided from the host 400 into a second physical address. The command generation controller 210 may store a second read command and the second physical address in the second read command queue 222'. The second physical address may include, for example, the plane number 0 P0, a block number 101 BLK101, the page number 5 PG5, and the sub-page number 0 S0.

The command schedule controller 230 may a first page number of the first physical address with a second page number of the second physical address. For example, it may be checked whether the first page number and the second page number are the same. The command schedule controller 230 may schedule the first physical address, the second physical address, and the second read command in the third read command queue 223' according to whether the first page number and the second page number are the same.

In an embodiment, a first plane number of the first physical address may be different from a second plane number of the second physical address. The command schedule controller 230 may schedule the first read command, the first physical address, the second physical address, and the second read command in a first priority index number of the third read command queue 223'. For example, the first physical address and the second physical address may be scheduled in an index number 0 Index of the third read command queue 223'. In addition, the read commands may be scheduled in the index number 0 Index of the third read command queue 223'. The read command RCMD1 stored in the index number 0 Index of the third read command queue 223' may include a read command corresponding to the first physical address and a read command corresponding to the second physical address.

In one embodiment, the first plane number of the first physical address may be equal to the second plane number of the second physical address, and a first block number of the first physical address may be equal to a second block number of the second physical address. The command schedule controller 230 may schedule the first physical address, the second physical address, and the second read command (or the first read command) in the first priority index number of the third read command queue 223'.

The first physical address and the second physical address may be combined in the third read command queue 223'. The read command BRCMD1 and the physical address, which are stored in the first read command queue 221, may be discarded.

Figure 17:
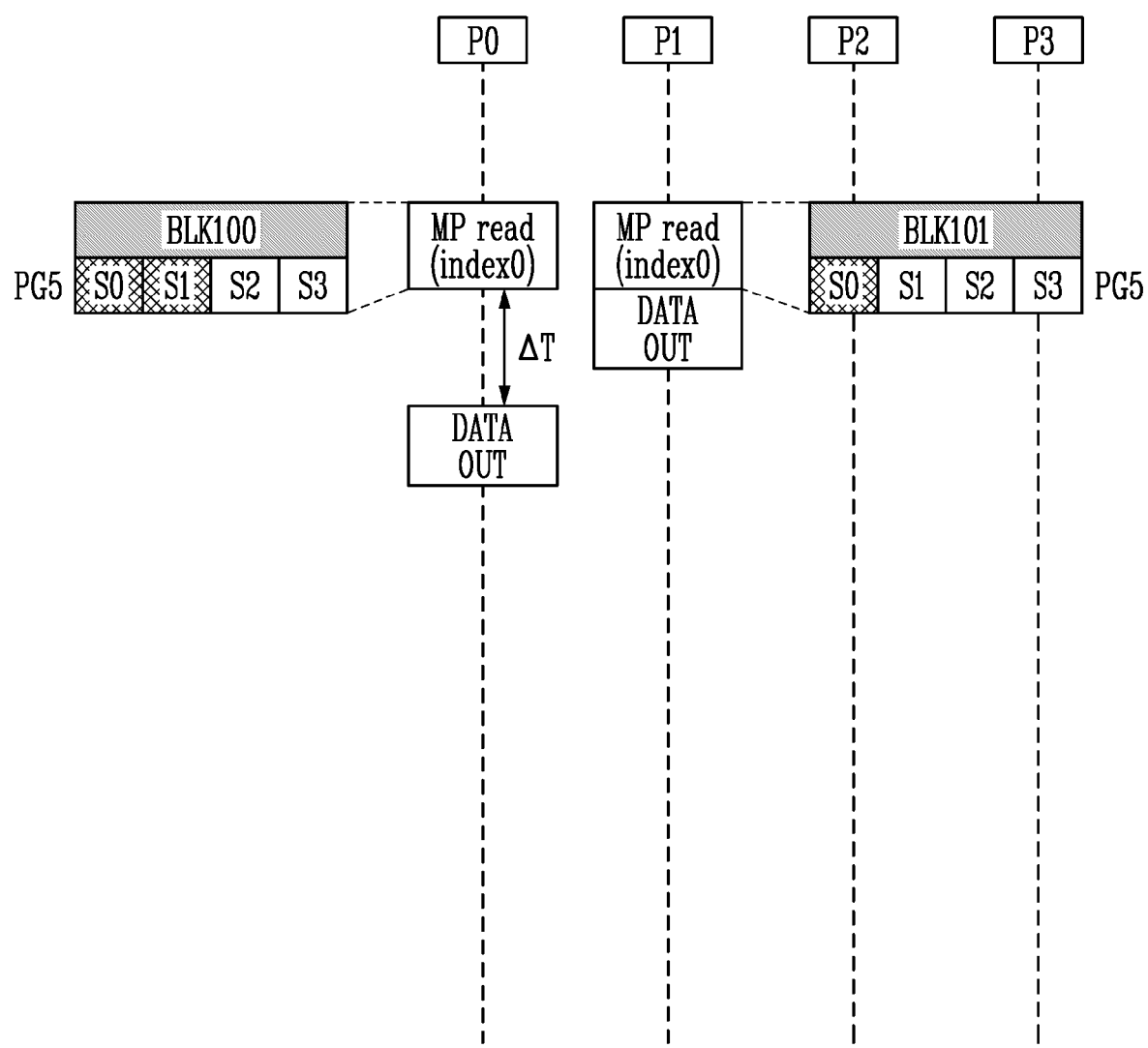
FIG. 17 illustrates an embodiment of a read operation.

FIG. 17 is a diagram illustrating an embodiment of a read operation performed in accordance with the embodiment shown in FIG. 16.

Referring to FIGS. 16 and 17, the read command RCMD1, the first physical address, and the second physical address, which are stored in the index number 0 Index0 of the third read command queue 223', may be provided in the memory device 100. The read command RCMD may include a read command (e.g., a first read command) instructing the memory device 100 to read a page of a first plane having the first physical address and a read command (e.g., a second read command) instructing the memory device 100 to read a page of a second plane having the second physical address.

The memory device 100 may simultaneously perform a read operation on the page of the first plane having the first physical address and the page of the second plane having the second physical address in response to the read command RCMD1. For example, the memory device 100 may perform a multi-plane read operation MP read on the first plane having the first physical address and the second plane having the second physical address.

When the multi-plane read operation MP read is performed, the memory device 100 may sequentially provide the memory controller 200 with data stored in the page of the first plane and data stored in the page of the second plane. For example, when the multi-plane read operation MP read performed on the zeroth plane 101 and the first plane 102 is completed, data stored in a page of the first plane 102 may be output (DATA OUT), and then data stored in a page of the zeroth plane 101 may be output (DATA OUT). For example, there may occur a different ΔT between a time at which the data is output by a read operation on the zeroth plane 101 and a time at which the data is output by a read operation on the first plane 102. This is because a response to the read request provided from the host 400 is prior to the background operation.

As described above, since a read command queue is realigned, the number of times all sensing operations to perform a read operation on a read request of host 400 are performed can be decreased. As a result, a phenomenon in which a response to the read request of the host 400 is delayed can be reduced or prevented, which, in turn, may increase performance of the read operation.

Figure 18:
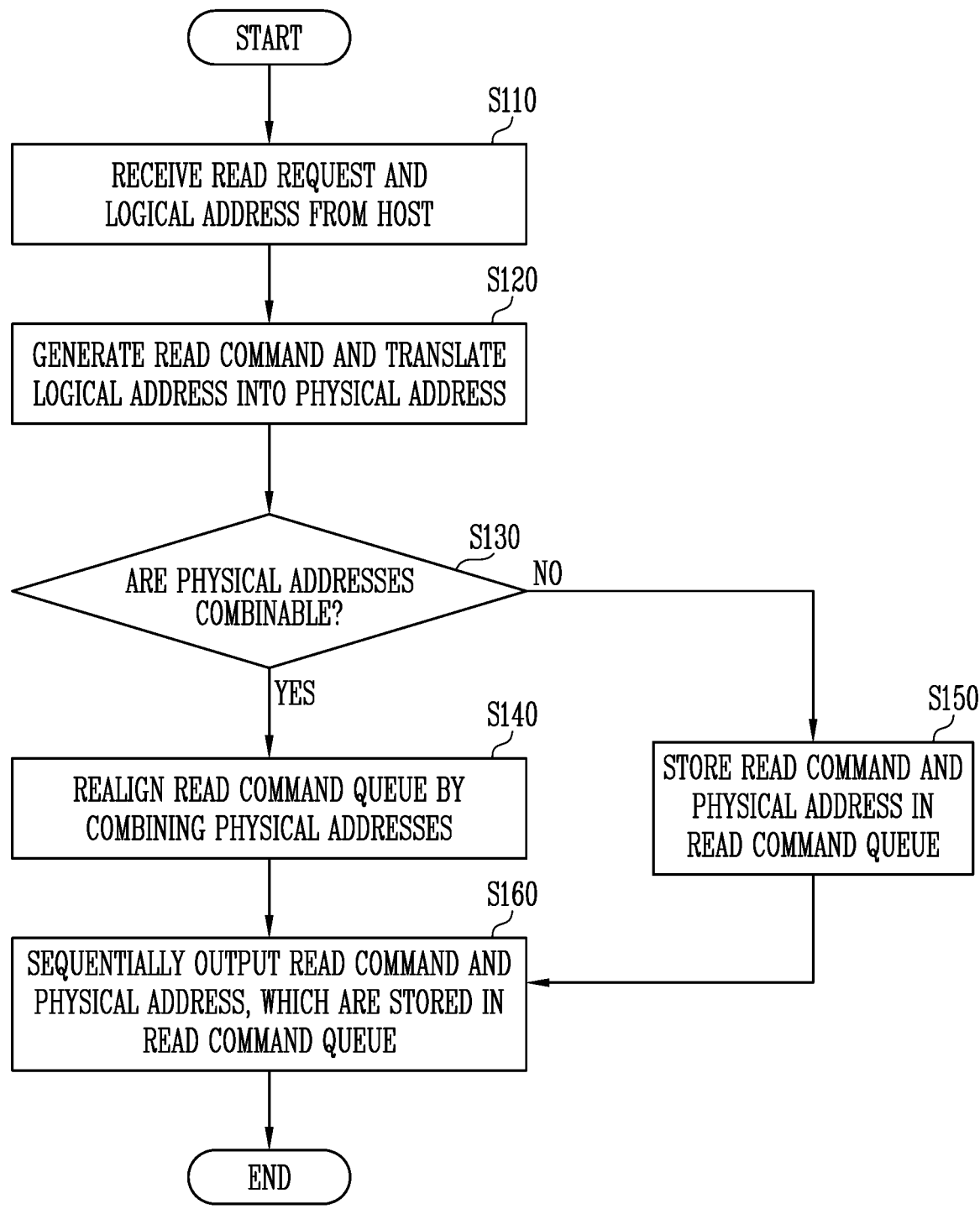
FIG. 18 illustrates an embodiment of a method of operating a memory controller.

FIG. 18 is a diagram illustrating an embodiment of a method of operating the memory controller 200.

Referring to FIG. 18, the method includes, at S110, memory controller 200 receiving a read request and a logical address from host 400.

At S120, memory controller 200 generates a read command, and translates the logical address into a physical address.

At S130, memory controller 200 determines whether the translated physical address and a physical address pre-stored in a read command queue are combinable. As described above, whether the physical addresses are combinable may be obtained by determining whether plane numbers of the physical addresses are different from each other and page numbers of the physical addresses are the same, by determining whether the physical addresses all have the same plane number, the same block number and the same page number, or by determining whether a read operation is to be performed using the plane interleaving scheme.

At S140, when the physical addresses are combinable (S130, YES), the memory controller 200 realigns the read command queue by combining the physical addresses. As described above, realigning the read command queue by combining the physical addresses may include scheduling the translated physical address in a standby column of the physical address pre-stored in the read command queue, such that a multi-plane read operation MP read or a single plane read operation SP read can be performed.

At S150, when the physical addresses are not combinable (S130, NO), the memory controller 200 stores the generated read command and the translated physical address in the read command queue. For example, the memory controller 200 stores the generated read command and the translated physical address in an empty standby column in the read command queue. This may be the same as described above.

At S160, the memory controller 200 may sequentially output the read command and the physical address, which are stored in the read command queue, to the memory device 100 according to a scheduled sequence.

Figure 19:
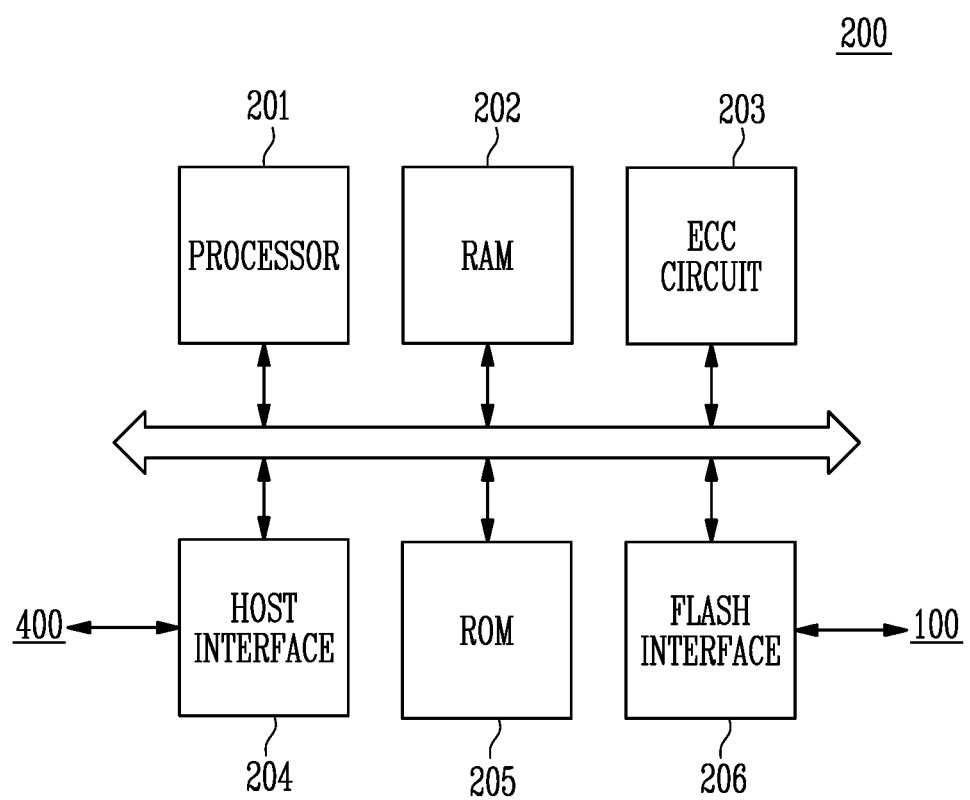
FIG. 19 illustrates an embodiment of a memory controller.

FIG. 19 is a diagram illustrating an embodiment of memory controller 200, which may include a processor 201, a RAM 202, an error correction code (ECC) circuit 203, a host interface 204, a ROM 205, and a flash interface 206. The processor 201 may control overall operation of the memory controller 200.

The RAM 202 may be used as a buffer memory, a cache memory, a working memory, etc. of the memory controller 200. Exemplarily, the RAM 202 may be a buffer memory.

The ECC circuit 203 may generate an ECC for correcting a fail bit or error bit of data received from the memory device 100. The ECC circuit 203 may generate data to which a parity bit is added by performing ECC encoding of data provided to the memory device 100. The parity bit may be stored in the memory device 100. The ECC circuit 203 may perform ECC decoding on data output from the memory device 100.

The ECC circuit 203 may correct an error using parity. For example, the ECC circuit 203 may correct an error using various coded modulations such as an LDPC code, a BCH code, a turbo code, a Reed-Solomon code, a convolution code, an RSC, a TCM, and a BCM.

The ECC circuit 203 may calculate an ECC value of data to be programmed to the memory device 100 in a program operation. The ECC circuit 203 may perform an error correction operation on data read from the memory device 100 in a read operation, based on the ECC value. The ECC circuit 203 may perform an error correction operation of data recovered from the memory device 100 in a recovery operation of data which fails.

The memory controller 200 may communicate with an external device (e.g., the host 400, an application processor, or the like) through the host interface 204.

The ROM 205 may store, in the form of firmware, various information for an operation of the memory controller 200.

The memory controller 200 may communicate with the memory device 100 through the flash interface 206. The memory controller 200 may transmit a command CMD, an address ADDR, a control signal CTRL, and the like to the memory device 100 through the flash interface 206, and receive data DATA.

The flash interface 206 may include, for example, a NAND interface.

Figure 20:
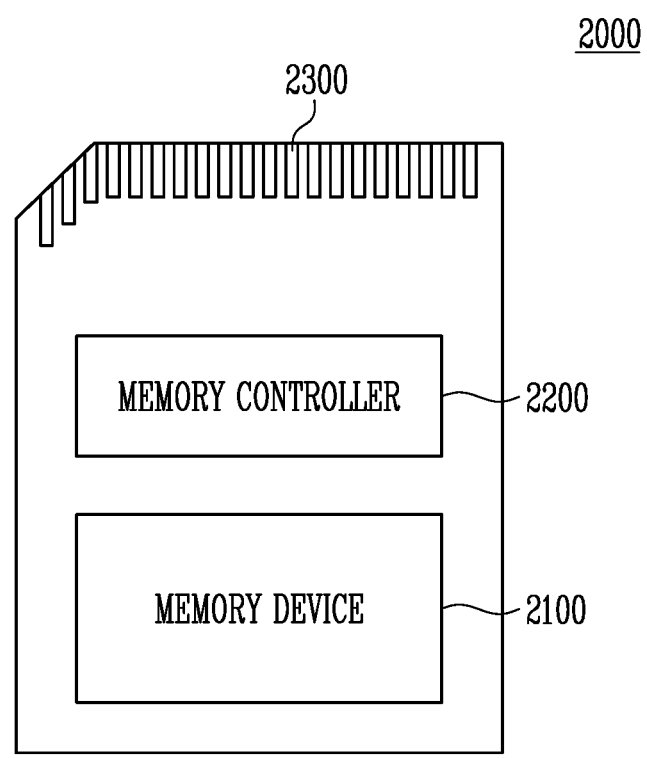
FIG. 20 illustrates an embodiment of a memory card system.

FIG. 20 is a block diagram illustrating an embodiment of a memory card system 2000, which may include a memory device 2100, a memory controller 2200, and a connector 2300.

The memory device 2100 may be implemented with various nonvolatile memory devices, such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 2200 is connected to and may access the memory device 2100. For example, the memory controller 2200 may control read, write, erase, and background operations of the memory device 2100. The memory controller 2200 provides an interface between the memory device 2100 and a Host. The memory controller 2200 may execute instructions (e.g., drive firmware) for controlling the memory device 2100. The memory controller 2200 may be implemented, for example, as memory controller 200 described with reference to FIG. 1.

The memory controller 2200 may include components such as a Random Access Memory (RAM), a processing unit, a host interface, a memory interface, and an error corrector. Also, the memory controller 2200 may communicate with an external device through the connector 2300.

The memory controller 2200 may communicate with the external device (e.g., the host 400) according to a specific communication protocol. Exemplarily, the memory controller 2200 may communicate with the external device through at least one of various communication protocols. Examples include a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe. Exemplarily, the connector 2300 may be defined by at least one of the above-described various communication protocols.

The memory device 2100 and the memory controller 2200 may be integrated into a single semiconductor device, to constitute a memory card. Examples of the memory card include a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 21:
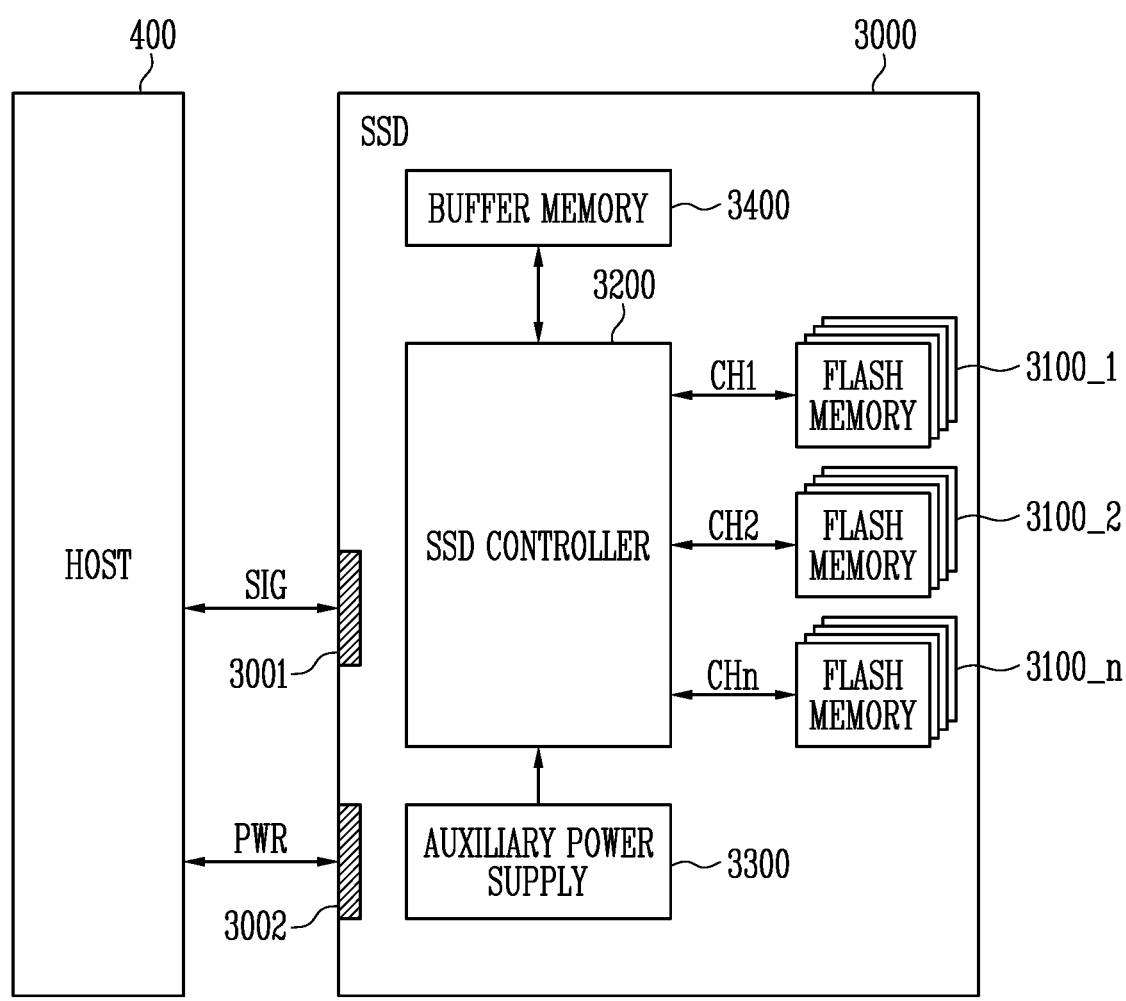
FIG. 21 illustrates an embodiment of a Solid State Drive system.

FIG. 21 is a block diagram illustrating an embodiment of a Solid State Drive (SSD) system, which may include a host 400 and an SSD 3000. The SSD 3000 exchanges a signal SIG with the host 400 through a signal connector 3001 and receives power PWR through a power connector 3002.

The SSD 3200 may include an SSD controller 3200, a plurality of flash memories 3100_1, 3100_2, and 3100_n, an auxiliary power supply 3300, and a buffer memory 3400. In accordance with an embodiment, the SSD controller 3200 may perform the same function as the memory controller 200 described with reference to FIG. 1.

Also, the SSD controller 3200 may control the plurality of flash memories 3100_1, 3100_2, and 3100_n in response to a signal SIG received from the host 400. For example, the signal SIG may be a signal based on an interface between the host 400 and the SSD 3000. For example, the signal SIG may be a signal defined by at least one of interfaces, such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 3300 is connected to the host 400 through the power connector 3002. The auxiliary power device 3300 may receive the power PWR input from the host 400 and using power PWR to perform a charging operation. When the supply of power from the host 400 is not smooth, the auxiliary power supply 3300 may provide power of the SSD 3000. Exemplarily, the auxiliary power supply 3300 may be located in the SSD 3000, or be located at the outside of the SSD 3000. For example, the auxiliary power supply 3300 may be located on a main board, and provide auxiliary power to the SSD 3000.

The buffer memory 3400 may temporarily store data. For example, the buffer memory 3400 may temporarily store data received from the host 400 or data received from the plurality of flash memories 3100_1, 3100_2, and 3100_n, or temporarily store meta data (e.g., a mapping table) of the flash memories 3100_1, 3100_2, and 3100_n. The buffer memory 3400 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 22:
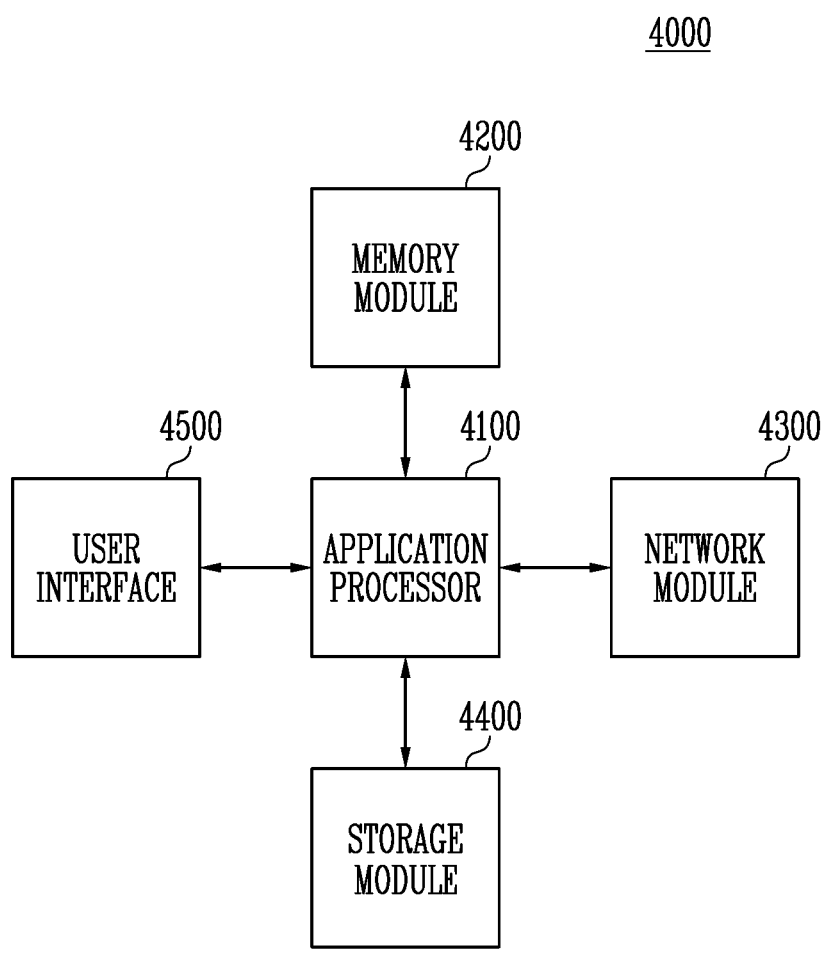
FIG. 22 illustrates an embodiment of a user system.

FIG. 22 is a block diagram illustrating an embodiment of a user system 4000 to which any of the embodiments of the storage device described herein may be applied.

Referring to FIG. 22, the user system 4000 includes an application processor 4100, a memory module 4200, a network module 4300, a storage module 4400, and a user interface 4500. The application processor 4100 may drive components included in the user system 4000, an operating system (OS), a user program, or the like. For example, the application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include one or more volatile random access memories, such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. The application processor 4100 and the memory module 4200 may be provided, for example, as one semiconductor package by being packaged based on a Package on Package (PoP).

The network module 4300 may communicate with external devices. For example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. The network module 4300 may be included, for example, in the application processor 4100.

The storage module 4400 may store data. For example, the storage module 4400 may store data received from the application processor 4100. Alternatively, the storage module 4400 may transmit data stored therein to the application processor 4100. For example, the storage module 4400 may be implemented with a nonvolatile semiconductor memory device, such as a Phase-change RAM (PRAM), a Magnetic RAM (MRAM), a Resistive RAM (RRAM), a NAND flash, a NOR flash, or a NAND flash having a three-dimensional structure. Exemplarily, the storage module 4400 may be provided as a removable drive such as a memory card of the user system 4000 or an external drive.

The storage module 4400 may operate, for example, as storage device 1000 described, for example, with reference to FIG. 1. The storage module 4400 may include a plurality of nonvolatile memory devices, which, for example, may operate as memory device 100 described with reference to FIG. 1.

The user interface 4500 may include one or more interfaces for inputting data or commands to the application processor 4100 and/or outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with one embodiment, an apparatus includes a controller that is configured to perform a realignment operation for information stored in a first read command queue. The controller may be, for example, the command schedule controller as described in accordance with the embodiments described herein, and the first read command queue may also be in accordance with any of the embodiments.

In operation, the controller may execute instructions stored in a non-transitory computer-readable medium to perform the realignment operation relative to the first read command queue and a second read command queue. For example, the controller may execute the instructions to receive a first physical address corresponding to a read command and a first plane number of a memory device, determine a first physical address group in the first read command queue having a second plane number, and store information in a second read command queue that represents realigned information stored in the first read command queue. The realigned information grouping the first physical address into the first physical address group.

In addition, the controller may execute the instructions to schedule execution of read operations for physical addresses in the first physical address group including the first physical address. In one embodiment, the first physical address in the first physical address group may be scheduled before a second physical address group that is included in both the first read command queue and the second read command queue. Also, the first plane number is equal to the second plane number.

In accordance with one or more embodiments, a memory controller is provided which is capable of improving performance of a read operation, and a storage device is also provided to include such a memory controller.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

When implemented in at least partially in software, the controllers, processors, devices, modules, schedulers, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

What is claimed is:

1. A memory controller, comprising:
a command storage including a first read command queue and a second read command queue, the first read command queue configured to store read commands and physical addresses corresponding to the read commands based on index number, wherein the read commands instruct a memory device to read data stored in a memory device including a plurality of memory blocks, and wherein each of the physical addresses correspond to a plane number, a block number, and a page number;
a command generation controller coupled to the command storage and configured to generate a first read command in response to a read request, translate a logical address to a first physical address, and store the first read command and the first physical address in the first read command queue; and
a command schedule controller coupled to the command storage and configured to search for a first physical address group in response to a scheduling event signal from the command generation controller, the first physical address group including at least one second physical address including a page number that corresponds to a physical address stored in the first read command queue and the first physical address,
wherein the command schedule controller is configured to sequentially schedule a second physical address group and the first physical address group in consecutive index numbers of the second read command queue, the second physical address group including at least one physical address with a plane number different from the plane number of the first physical address group stored in the first read command queue.

2. The memory controller of claim 1, wherein the command generation controller is configured to
provide the memory device with an erase command instructing the memory device to perform an erase operation including erasing data stored in one memory block of the plurality of memory blocks,
provide the memory device with a suspend command instructing the memory device to suspend the erase operation in response to a request,
provide the memory device with a resume command instructing the memory device to resume the erase operation, after an operation corresponding to the request, and
provide the scheduling event signal to the command schedule controller after the resume command is output.

3. The memory controller of claim 1, wherein the command generation controller is configured to
provide the memory device with a command instructing the memory device to perform an erase operation including erasing data stored in one memory block of the plurality of memory blocks, or to perform a write operation including storing data in one memory block of the plurality of memory blocks, and
provide the scheduling event signal to the command schedule controller after a predetermined period elapses from when the command is provided to the memory device.

4. The memory controller of claim 1, wherein the first physical address and the at least one second physical address have a same plane number and a same block number.

5. The memory controller of claim 4, wherein the command schedule controller is configured to schedule the first read command and the first physical address group in one index number of the second read command queue.

6. The memory controller of claim 1, wherein the first physical address and the at least one second physical address have different plane numbers.

7. The memory controller of claim 6, wherein the command schedule controller is configured to schedule the first read command, at least one second read command corresponding to the at least one second physical address, and the first physical address group in one index number of the second read command queue.

8. A memory controller, comprising:
a command storage including a first read command queue, a second read command queue, and a third read command queue, wherein the first read command queue is configured to store a first physical address and a first read command instructing a memory device to perform a read operation while a background operation is performed, and wherein the first physical address corresponds to a first plane number, a first block number, and a first page number;
a command generation controller coupled to the command storage and configured to translate, to a second physical address, a logical address and generate a second read command instructing the memory device to read data stored in the memory device, in response to a read request provided while the background operation is performed, and store the second read command and the second physical address in the second read command queue, wherein the second physical address corresponds to a second plane number, a second block number, and a second page number; and
a command schedule controller coupled to the command storage and configured to schedule the first physical address, the second physical address, and the second read command in the third read command queue according to whether the first page number equals the second page number.

9. The memory controller of claim 8, wherein
the first plane number is equal to the second plane number,
the first block number is equal to the second block number, and
the command schedule controller is configured to schedule the first physical address, the second physical address, and the second read command in a first priority index number of the third read command queue.

10. The memory controller of claim 9, wherein
the first plane number is different from the second plane number, and
the command schedule controller is configured to schedule the first read command, the first physical address, the second physical address, and the second read command in the first priority index number of the third read command queue.

11. A storage device, comprising:
a memory device including a plurality of planes; and
a memory controller configured to store, in a first read command queue, a first read command and a first physical address in response to a read request, the first read command instructing the memory device to perform a read operation including reading data stored in the memory device by using the first physical address mapped to a logical address,
wherein the memory controller is further configured to sequentially provide read commands and physical addresses, which are stored in the first read command queue, to the memory device according to a scheduled sequence, and wherein
each of the physical addresses includes a plane number, a block number, and a page number, and
when a page number of a second physical address scheduled in a first priority index number among index numbers of the first read command queue and a page number of the first physical address are equal, the memory controller is configured to schedule the first physical address in the first priority index number.

12. The storage device of claim 11, wherein
the first physical address and the second physical address are physical addresses having a same plane number, a same block number, and a same page number, and
the memory controller is configured to schedule the first physical address in the first priority index number.

13. The storage device of claim 12, wherein the memory device is configured to:
perform a read operation on a page of a single plane having the first physical address and the second physical address in response to a second read command corresponding to the second physical address; and
provide the memory controller with data stored in the page of the single plane.

14. The storage device of claim 11, wherein
the first physical address and the second physical address have different plane numbers and a same page number, and
the memory controller is configured to schedule the first read command and the first physical address in the first priority index number.

15. The storage device of claim 14, wherein the memory device is configured to:
  simultaneously perform a read operation on a page of a first plane having the first physical address and a page of a second plane having the second physical address in response to the second read command, corresponding to the second physical address and the first read command; and
  sequentially provide data stored in the page of the first plane and data stored in the page of the second plane to the memory controller.

16. The storage device of claim 11, wherein
  when a page number of the first physical address is different from a page number of the second physical address, the memory controller is configured to schedule the first read command and the first physical address in an index number to be output next to the read commands and the physical addresses, which are stored in the first read command queue.

17. The storage device of claim 16, wherein the memory device is configured to:
  perform a read operation on a page of a plane having the second physical address in response to the second read command corresponding to the second physical address; and
  perform a read operation on a page of a plane having the first physical address in response to the first read command, after the read operation on the plane having the second physical address is completed.

18. The storage device of claim 16, wherein the memory controller is configured to:
  search for a physical address group including all physical addresses having different plane numbers, among the physical addresses stored in the first read command queue and the first physical address, in response to occurrence of a scheduling event; and
  sequentially schedule the other physical addresses except the physical address group among the physical addresses stored in the first read command queue and the first physical address, the physical address group, and read commands in consecutive index numbers of a second read command queue.

19. The storage device of claim 18, wherein
  the memory device is configured to perform read operations on a plurality of planes sequentially in response to read commands corresponding to the physical address group, and
  the read operations are configured to partially overlap with each other.

20. The storage device of claim 19, wherein the memory device is configured to sequentially provide data output from each plane to the memory controller.

* * * * *